US012525426B2

(12) United States Patent
Wang

(10) Patent No.: US 12,525,426 B2
(45) Date of Patent: Jan. 13, 2026

(54) ENHANCED ARCHITECTURE FOR HIGH-PERFORMANCE DETECTION DEVICE

(71) Applicant: ASML Netherlands B.V., Veldhoven (NL)

(72) Inventor: Yongxin Wang, San Ramon, CA (US)

(73) Assignee: ASML Netherlands B.V., Veldhoven (NL)

( * ) Notice: Subject to any disclaimer, the term of this patent is extended or adjusted under 35 U.S.C. 154(b) by 523 days.

(21) Appl. No.: 17/922,780

(22) PCT Filed: Apr. 23, 2021

(86) PCT No.: PCT/EP2021/060747
§ 371 (c)(1),
(2) Date: Nov. 1, 2022

(87) PCT Pub. No.: WO2021/219519
PCT Pub. Date: Nov. 4, 2021

(65) Prior Publication Data
US 2023/0170179 A1  Jun. 1, 2023

Related U.S. Application Data

(60) Provisional application No. 63/019,179, filed on May 1, 2020.

(51) Int. Cl.
*H01J 37/244* (2006.01)
*G01N 23/2206* (2018.01)
*H01J 37/28* (2006.01)

(52) U.S. Cl.
CPC ........ *H01J 37/244* (2013.01); *G01N 23/2206* (2013.01); *G01N 2223/507* (2013.01);
(Continued)

(58) Field of Classification Search
CPC .. H01J 37/244; H01J 37/28; H01J 2237/2441; H01J 2237/24495;
(Continued)

(56) References Cited

U.S. PATENT DOCUMENTS 4,680,429 A * 7/1987 Murdock ................ G06F 3/045
178/18.05
5,023,559 A * 6/1991 Andermo ............... G01B 7/003
340/870.37
(Continued)

FOREIGN PATENT DOCUMENTS

CN  109313074 A  2/2019
GB  2352323 A  1/2001
(Continued)

OTHER PUBLICATIONS

International Search Report issued in related PCT International Application No. PCT/EP2021/060747; mailed Aug. 17, 2021 (3 pgs.).

(Continued)

*Primary Examiner* — David A Vanore
(74) *Attorney, Agent, or Firm* — Finnegan, Henderson, Farabow, Garrett & Dunner, LLP

(57) ABSTRACT

A detector includes a set of sensing elements, first section circuitry communicatively coupling a first set of sensing elements to an input of first signal processing circuitry, second section circuitry communicatively coupling a second set of sensing elements to an input of second signal processing circuitry, and interconnection circuitry communicatively coupling an output of the first signal processing circuitry to an output of the second signal processing circuitry. The interconnection circuitry may include an interconnection layer having interconnection switching elements communicatively coupled to outputs of analog signal paths of the detector. Interconnection switching elements may (Continued)

communicatively couple the outputs of adjacent analog signal paths. The detector may also include signal processing circuitry that includes a plurality of converters. The interconnection circuitry may be configured to selectively couple outputs of the first and second signal processing circuitry to the converters.

20 Claims, 17 Drawing Sheets

(52) U.S. Cl.
CPC ....... *G01N 2223/6116* (2013.01); *H01J 37/28* (2013.01); *H01J 2237/2441* (2013.01); *H01J 2237/24495* (2013.01); *H01J 2237/24521* (2013.01)

(58) Field of Classification Search
CPC ..... H01J 2237/24521; H01J 2237/2446; H01J 2237/2817; G01N 23/2206; G01N 2223/507; G01N 2223/6116
See application file for complete search history.

(56) References Cited

U.S. PATENT DOCUMENTS

| | | | |
|---|---|---|---|
| 5,189,423 A | 2/1993 | Linnenbrink et al. | |
| 5,820,558 A * | 10/1998 | Chance | A61B 5/1455 600/476 |
| 6,137,151 A * | 10/2000 | Street | H10F 39/18 257/443 |
| 6,542,772 B1 * | 4/2003 | Chance | A61B 5/4312 600/476 |
| 6,897,458 B2 | 5/2005 | Wieland et al. | |
| 7,796,174 B1 * | 9/2010 | Harwit | H04N 25/78 348/311 |
| 8,169,522 B2 * | 5/2012 | Orava | H04N 5/325 348/308 |
| 10,163,603 B2 * | 12/2018 | Zeidler | H01J 37/244 |
| 11,476,085 B2 * | 10/2022 | Wang | H10F 39/803 |
| 2002/0089589 A1 * | 7/2002 | Adair | A61B 1/05 348/14.02 |
| 2005/0242302 A1 | 11/2005 | Platzgummer et al. | |
| 2005/0269528 A1 | 12/2005 | Kruit | |
| 2009/0219035 A1 * | 9/2009 | Apte | G09G 3/006 324/555 |
| 2010/0321227 A1 * | 12/2010 | Hales | H03M 1/146 341/158 |
| 2012/0280131 A1 * | 11/2012 | Spartiotis | H04N 25/46 250/366 |
| 2013/0009069 A1 * | 1/2013 | Okada | G01T 1/243 250/370.09 |
| 2013/0163722 A1 * | 6/2013 | Okada | G01N 23/04 378/62 |
| 2015/0348738 A1 * | 12/2015 | Zeidler | H01J 37/10 250/396 R |
| 2015/0348749 A1 * | 12/2015 | Lang | H01J 37/261 250/307 |
| 2015/0357157 A1 | 12/2015 | Mueller et al. | |
| 2016/0071696 A1 | 3/2016 | Kuiper et al. | |
| 2016/0095559 A1 | 4/2016 | Gagnon et al. | |
| 2017/0090041 A1 * | 3/2017 | Yokoyama | H04N 23/30 |
| 2019/0049866 A1 * | 2/2019 | Huisman | G01D 5/266 |
| 2019/0317167 A1 * | 10/2019 | Laborde | B01L 3/50273 |
| 2019/0356394 A1 * | 11/2019 | Bunandar | G06N 3/084 |
| 2021/0382404 A1 * | 12/2021 | Huisman | G02B 6/02042 |
| 2022/0416908 A1 * | 12/2022 | Bunandar | G06N 3/0675 |

FOREIGN PATENT DOCUMENTS

| | | | | |
|---|---|---|---|---|
| TW | I260089 B | 8/2006 | | |
| TW | 201921659 A | 6/2019 | | |
| TW | 201937530 A | 9/2019 | | |
| WO | WO 01/60456 A1 | 8/2001 | | |
| WO | WO 02/15223 A1 | 2/2002 | | |
| WO | WO 2005/024881 A2 | 3/2005 | | |
| WO | 2019053173 A1 | 3/2019 | | |
| WO | WO-2019192821 A1 * | 10/2019 | ............ | H01J 37/244 |
| WO | WO-2019201544 A1 * | 10/2019 | ............ | H01J 37/244 |
| WO | WO-2024033070 A1 * | 2/2024 | ............ | H01J 37/244 |
| WO | WO-2024033097 A1 * | 2/2024 | ............ | H01J 37/244 |

OTHER PUBLICATIONS

Office Action of the Intellectual Property Office issued in related Taiwan Application No. 110115056; mailed May 19, 2022 (8 pgs.).
Basiladze S G: "Methods for data readout, acquisition, and transfer in experimental nuclear physics setups (A Review, Part 1)" Instruments and Experimental Techniques, Consultants Bureau. New York, US, vol. 60, No. 4, Jul. 30, 2017 (Jul. 30, 2017), pp. 463-521, XP036288001, ISSN: 0020-4412, DOI: 10.1134/S002044121704011X [retrieved on Jul. 30, 2017] the whole document (59 pgs.).

* cited by examiner

ENHANCED ARCHITECTURE FOR HIGH-PERFORMANCE DETECTION DEVICE

CROSS-REFERENCE TO RELATED APPLICATIONS

This application claims priority to International Application No. PCT/EP2021/060747, filed Apr. 23, 2021, and published as WO 2021/219519 A1, which claims priority of U.S. application 63/019,179 which was filed on May 1, 2020. The contents of these applications are incorporated herein by reference in their entireties.

TECHNICAL FIELD

The description herein relates to detectors, and more particularly, to detectors that may be applicable to charged particle detection.

BACKGROUND

In manufacturing processes of integrated circuits (ICs), unfinished or finished circuit components are inspected to ensure that they are manufactured according to design and are free of defects. An inspection system utilizing an optical microscope typically has a resolution down to a few hundred nanometers, and the resolution is limited by the wavelength of light. As the physical sizes of IC components continue to reduce down to sub-100 or even sub-10 nanometers, inspection systems capable of higher resolution than those utilizing optical microscopes are needed.

A charged particle (e.g., electron) beam microscope, such as a scanning electron microscope (SEM) or a transmission electron microscope (TEM), capable of resolution down to less than a nanometer, serves as a practical tool for inspecting IC components having a feature size that is sub-100 nanometers. With a SEM, electrons of a single primary charged-particle beam, or electrons of a plurality of primary charged-particle beams, can be focused at locations of interest of a wafer under inspection. The primary electrons interact with the wafer and may be backscattered or may cause the wafer to emit secondary electrons. The intensity of the electron beams comprising the backscattered electrons and the secondary electrons may vary based on the properties of the internal and external structures of the wafer, and thereby may indicate whether the wafer has defects.

SUMMARY

Embodiments consistent with the present disclosure include apparatuses, systems, and methods for beam detection for a charged-particle inspection system, such as ultrafast beam current detection. In some embodiments, a detector may include a set of sensing elements including a first set of sensing elements and a second set of sensing elements. The detector may also include first section circuitry configured to communicatively couple the first set of sensing elements to an input of first signal processing circuitry. The detector may further include second section circuitry configured to communicatively couple the second set of sensing elements to an input of second signal processing circuitry. The detector may further include interconnection circuitry configured to communicatively couple an output of the first signal processing circuitry to an output of the second signal processing circuitry. In some embodiments, the detection system may further include an interface configured to control image signal processing of the detection system.

In some embodiments, a charged-particle inspection system may include a charged-particle beam source configured to generate a primary charged-particle beam for scanning a sample. The charged-particle inspection system may also include a detector configured to receive a secondary charged-particle beam exiting from a point of incidence of the primary charged-particle beam. The detector may include sets of sensing elements including a first set of sensing elements and a second set of sensing elements. The detector may also include first section circuitry configured to communicatively couple the first set of sensing elements to an input of first signal processing circuitry. The detector may further include second section circuitry configured to communicatively couple the second set of sensing elements to an input of second signal processing circuitry. The detector may further include interconnection circuitry configured to communicatively couple an output of the first signal processing circuitry to an output of the second signal processing circuitry.

In some embodiments, the first signal processing circuitry may include a first amplifier, and the second signal processing circuitry may include a second amplifier. At least one of the first amplifier or the second amplifier may be configured to perform one of receiving a current signal and outputting an amplified current signal, or receiving an electric-charge signal and outputting an amplified electric-charge signal.

In some embodiments, a computer-implemented method may include determining a sensing-element group comprising a sensing element being projected by a beam spot of a charged-particle beam in a charged-particle detector. The computer-implemented method may also include determining whether a total analog signal bandwidth for processing an output signal of the sensing-element group under a predetermined pixel rate satisfies a condition. The computer-implemented method may further include, based on a determination that the total analog signal bandwidth satisfies the condition, dividing the sensing-element group into a plurality of sensing-element subgroups, each sensing-element subgroup comprising at least one sensing element of the sensing-element group. The computer-implemented method may further include communicatively coupling the plurality of sensing-element subgroups to a plurality of signal processing circuits of the charged-particle detector. The computer-implemented method may further include determining a combined signal using output signals of the plurality of signal processing circuits at a first output of an interconnection layer communicatively coupled to the plurality of signal processing circuits. The computer-implemented method may further include outputting the combined signal to a first analog-to-digital converter (ADC) communicatively coupled to the first output of the interconnection layer.

DETAILED DESCRIPTION

Figure 1:
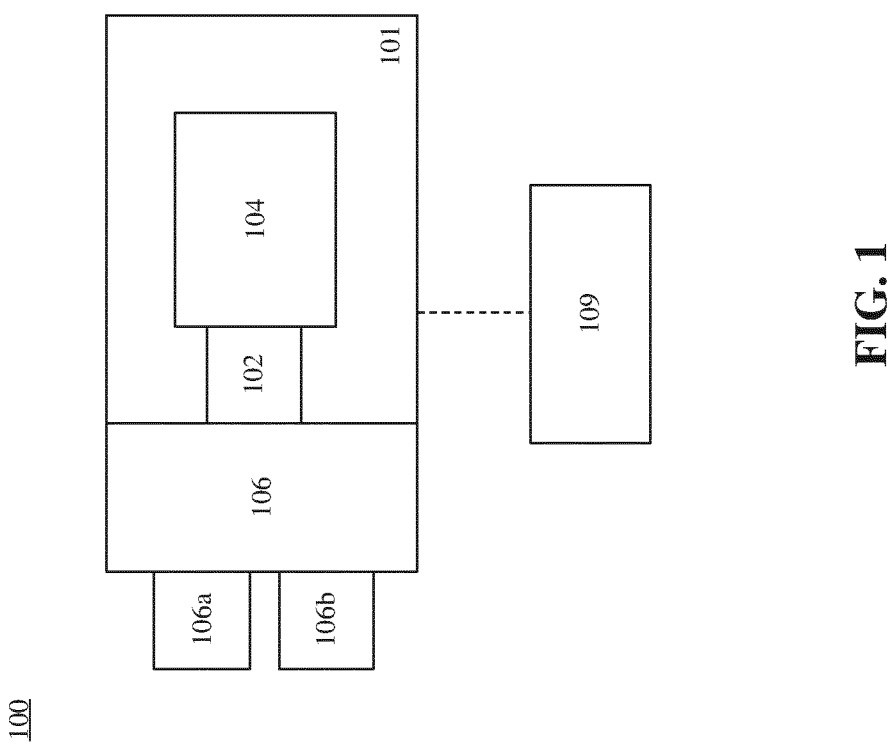
FIG. 1 is a schematic diagram illustrating an exemplary charged-particle beam inspection system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims. For example, although some embodiments are described in the context of utilizing charged-particle beams (e.g., electron beams), the disclosure is not so limited. Other types of charged particle beams may be similarly applied. Furthermore, other imaging systems may be used, such as optical imaging, photodetection, x-ray detection, or the like.

Electronic devices are constructed of circuits formed on a piece of semiconductor material called a substrate. The semiconductor material may include, for example, silicon, gallium arsenide, indium phosphide, or silicon germanium, or the like. Many circuits may be formed together on the same piece of silicon and are called integrated circuits or ICs. The size of these circuits has decreased dramatically so that many more of them can be fit on the substrate. For example, an IC chip in a smartphone can be as small as a thumbnail and yet may include over 2 billion transistors, the size of each transistor being less than $1/1000$th the size of a human hair.

Making these ICs with extremely small structures or components is a complex, time-consuming, and expensive process, often involving hundreds of individual steps. Errors in even one step have the potential to result in defects in the finished IC, rendering it useless. Thus, one goal of the manufacturing process is to avoid such defects to maximize the number of functional ICs made in the process; that is, to improve the overall yield of the process.

One component of improving yield is monitoring the chip-making process to ensure that it is producing a sufficient number of functional integrated circuits. One way to monitor the process is to inspect the chip circuit structures at various stages of their formation. Inspection can be carried out using a scanning charged-particle microscope ("SCPM"). For example, an SCPM may be a scanning electron microscope (SEM). A SCPM can be used to image these extremely small structures, in effect, taking a "picture" of the structures of the wafer. The image can be used to determine if the structure was formed properly in the proper location. If the structure is defective, then the process can be adjusted, so the defect is less likely to recur.

The working principle of a SEM is similar to a camera. A camera takes a picture by receiving and recording intensity of light reflected or emitted from people or objects. A SEM takes a "picture" by receiving and recording energies or quantities of electrons reflected or emitted from the structures of the wafer. Before taking such a "picture," an electron beam may be projected onto the structures, and when the electrons are reflected or emitted ("exiting") from the structures (e.g., from the wafer surface, from the structures underneath the wafer surface, or both), a detector of the SEM may receive and record the energies or quantities of those electrons to generate an inspection image. To take such a "picture," the electron beam may scan through the wafer (e.g., in a line-by-line or zig-zag manner), and the detector may receive exiting electrons coming from a region under electron-beam projection (referred to as a "beam spot"). The beam projected onto the wafer may be referred to as the "primary beam." The detector may receive exiting electrons in a secondary beam spot on the surface of the detector, and may record the intensity of the secondary beam spot. By associating the secondary beam intensity over time with the scan path of the primary beam, a SEM image of the wafer may be constructed. Some SEMs use a single electron beam (referred to as a "single-beam SEM") to take a single "picture" to generate the inspection image, while some SEMs use multiple electron beams (referred to as a "multi-beam SEM") to take multiple "sub-pictures" of the wafer in parallel and stitch them together to generate the inspection image. By using multiple electron beams, the SEM may provide more electron beams onto the structures for obtaining these multiple "sub-pictures," resulting in more electrons exiting from the structures. Accordingly, the detector may receive more exiting electrons simultaneously and generate inspection images of the structures of the wafer with higher efficiency and faster speed.

Exiting electrons received by the detector of the SEM may cause the detector to generate electrical signals (e.g., current signals or voltage signals) commensurate to the energy of the exiting electrons and the intensity of the electron beam. For example, the amplitudes of the electrical signals may be commensurate to the charges of the received exiting electrons. The detector may output the electrical signals to an image processor, and the image processor may process the electrical signals to form the image of structures of the wafer. A multi-beam SEM system uses multiple electron beams for inspection, and a detector of the multi-beam SEM system may have multiple sections to receive them. Each section may have multiple sensing elements and may be used to form a "picture" of a sub-region of the wafer. The "picture" generated based on signals from each section of the detector may be merged to form a complete picture of the inspected wafer.

The sections of the detector may be communicatively interconnected. Each section of the detector may have corresponding signal processing circuits for processing the electrical signals generated by the detector. When an electron beam impinges on a section, its signal processing circuits may be activated for signal processing. When an electron beam impinges on multiple adjacent sections, their signal processing circuits may be activated in a coordinated way for signal processing. When no electron beam impinges on a section, its signal processing circuits may be deactivated. When an electron beam impinges on a malfunctioning section, signal processing circuits of an adjacent section may be activated for signal processing. By such an interconnecting-section design, the detector of the SEM may provide flexibilities and malfunction tolerance to signal processing of the detector.

The detector has many performance indicators. One indicator is the "pixel rate," which is the rate at which pixels of the inspection image are generated. The pixel rate may indicate the digital data processing bandwidth in a digital system, and the maximum pixel rate of a detector may indicate its maximum digital data processing speed. Another indicator is the "analog signal bandwidth," which is the frequency range between the lowest and highest attainable frequency of analog signals. High-frequency analog signals may reflect "details" of the inspected structures. The analog signal bandwidth indicates the detection capability of the detector and fineness of the inspection results, which is a different performance indicator from the pixel rate. For example, even if the pixel rate is high, the inspection image may still be blurred if the analog signal bandwidth is low, because some details of the structures may be lost due to the low analog signal bandwidth and may not be reflected in the inspection image.

The pixel rate and analog signal bandwidth are prone to "parasitic parameters," which are undesired or unexpected electromagnetic effects incurred by operating components of the detector. The parasitic parameters may include parasitic capacitance (e.g., stray capacitance), parasitic resistance, or parasitic inductance. The parasitic parameters may be incurred even when some components are not operating. The parasitic parameters may alter the designed specification of the components, and may cause adverse effects to the performance of the detector, such as reducing analog signal bandwidth and data processing bandwidth. For example, stray capacitance may resist the movement of electric charges. Parasitic resistance may increase internal detection signal loss. Parasitic inductance may resist the flow of a dynamic electric current. In addition, the parasitic parameters may introduce noise and interference to the inspection image. Ideally, the design of a detector strives to minimize the generation of the parasitic parameters.

The pixel rate and analog signal bandwidth may have critical impact to other performance indicators of the detector, such as a signal-to-noise ("SNR") ratio or performance capacity (e.g., maximum inspection speed or maximum inspection throughput) of the detector. For increasing the pixel rate and analog signal bandwidth, a detector may be designed to shorten the distance of the electrical connections between individual sensing elements and their signal processing circuits, which may suppress the generation of parasitic parameters (e.g., series resistance, parasitic capacitance, or series inductance). Alternatively, architectures of the signal processing circuits may be enhanced or redesigned for the detector to be less sensitive to the parasitic parameters.

However, the existing interconnecting-section design of the detector still faces several challenges related to the analog signal bandwidth and the pixel rate. For example, there is still room to further suppress the generation of parasitic parameters, to reduce the impact of parasitic parameters on analog signal bandwidth, to increase processing bandwidth of analog or digital signal processing, or to increase the pixel rate and the performance adaptability of the detector, without incurring significant costs.

In this disclosure, a detector with an improved architecture is provided for improving the analog signal bandwidth and the pixel rate. In some embodiments of the detector, an interconnection layer is provided between analog signal processing circuitry of the detector and current- or charge-based analog-to-digital converters (ADCs) corresponding to the analog signal processing circuitry. An advantage of such an architecture is reduced sensitivity of current- or charge-based analog processing circuitry, compared with equivalent voltage-based analog processing circuitry, which enables relatively increased analog signal bandwidth. The interconnection layer may communicatively couple outputs of the analog signal processing circuitry to each other via interconnection switching elements. Switching elements may be provided at the inputs and outputs of the analog signal processing circuitry. By controlling the switching elements, different analog signal processing circuits may be communicatively activated or deactivated in the detector. By coupling the outputs of different analog signal processing circuits via the interconnection switching elements in the interconnection layer, multiple analog signal processing circuits may be associated with a single current- or charge-based ADC via the interconnection layer, by which a high analog signal bandwidth may be achieved without necessitating additional digital output capacity. By coupling the ADCs via the interconnection layer, the ADCs may be controlled to work in an interleaving mode, which may provide a pixel rate higher than the specification of a single ADC. Overall, by using the provided architecture, the limits of the performance adaptability and capability of existing detectors may be pushed higher.

Relative dimensions of components in drawings may be exaggerated for clarity. Within the following description of drawings, the same or like reference numbers refer to the same or like components or entities, and only the differences with respect to the individual embodiments are described.

Objects and advantages of the disclosure may be realized by the elements and combinations as set forth in the embodiments discussed herein. However, embodiments of the present disclosure are not necessarily required to achieve such exemplary objects or advantages, and some embodiments may not achieve any of the stated objects or advantages.

Without limiting the scope of the present disclosure, some embodiments may be described in the context of providing detection systems and detection methods in systems utilizing electron beams ("e-beams"). However, the disclosure is not so limited. Other types of charged particle beams may be similarly applied. Furthermore, systems and methods for detection may be used in other imaging systems, such as optical imaging, photon detection, x-ray detection, ion detection, or the like.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

FIG. 1 illustrates an exemplary electron beam inspection (EBI) system 100 consistent with embodiments of the present disclosure. EBI system 100 may be used for imaging. As shown in FIG. 1, EBI system 100 includes a main chamber 101, a load/lock chamber 102, a beam tool 104, and an equipment front end module (EFEM) 106. Beam tool 104 is located within main chamber 101. EFEM 106 includes a first loading port 106a and a second loading port 106b. EFEM 106 may include additional loading ports. First loading port 106a and second loading port 106b receive wafer front opening unified pods (FOUPs) that contain wafers (e.g., semiconductor wafers or wafers made of other materials) or samples to be inspected (wafers and samples may be used interchangeably). A "lot" is a plurality of wafers that may be loaded for processing as a batch.

One or more robotic arms (not shown) in EFEM 106 may transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robotic arms (not shown) may transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by beam tool 104. Beam tool 104 may be a single-beam system or a multi-beam system.

A controller 109 is electronically connected to beam tool 104. Controller 109 may be a computer configured to execute various controls of EBI system 100. While controller 109 is shown in FIG. 1 as being outside of the structure that includes main chamber 101, load/lock chamber 102, and EFEM 106, it is appreciated that controller 109 may be a part of the structure.

In some embodiments, controller 109 may include one or more processors (not shown). A processor may be a generic or specific electronic device capable of manipulating or processing information. For example, the processor may include any combination of any number of a central processing unit (or "CPU"), a graphics processing unit (or "GPU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type circuit capable of data processing. The processor may also be a virtual processor that includes one or more processors distributed across multiple machines or devices coupled via a network.

In some embodiments, controller 109 may further include one or more memories (not shown). A memory may be a generic or specific electronic device capable of storing codes and data accessible by the processor (e.g., via a bus). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes and data may include an operating system (OS) and one or more application programs (or "apps") for specific tasks. The memory may also be a virtual memory that includes one or more memories distributed across multiple machines or devices coupled via a network.

Figure 2:
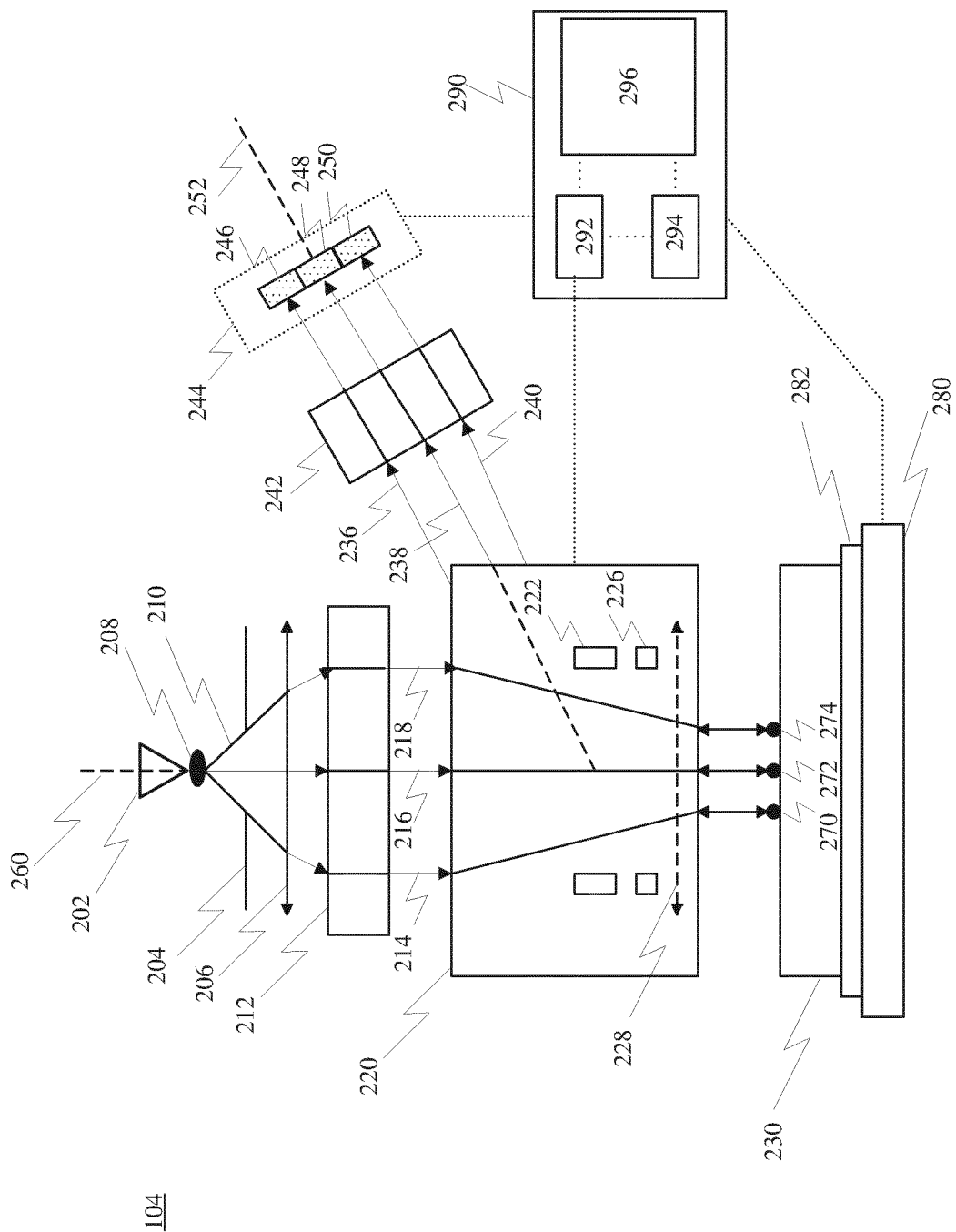
FIG. 2 is a schematic diagram illustrating an exemplary multi-beam beam tool, consistent with embodiments of the present disclosure that can be a part of the exemplary charged-particle beam inspection system of FIG. 1.

FIG. 2 illustrates a schematic diagram of an exemplary multi-beam beam tool 104 (also referred to herein as apparatus 104) and an image processing system 290 that may be configured for use in EBI system 100 (FIG. 1), consistent with embodiments of the present disclosure.

Beam tool 104 comprises a charged-particle source 202, a gun aperture 204, a condenser lens 206, a primary charged-particle beam 210 emitted from charged-particle source 202, a source conversion unit 212, a plurality of beamlets 214, 216, and 218 of primary charged-particle beam 210, a primary projection optical system 220, a motorized wafer stage 280, a wafer holder 282, multiple secondary charged-particle beams 236, 238, and 240, a secondary optical system 242, and a charged-particle detection device 244. Primary projection optical system 220 can comprise a beam separator 222, a deflection scanning unit 226, and an objective lens 228. Charged-particle detection device 244 may comprise detection sub-regions 246, 248, and 250.

Charged-particle source 202, gun aperture 204, condenser lens 206, source conversion unit 212, beam separator 222, deflection scanning unit 226, and objective lens 228 may be aligned with a primary optical axis 260 of apparatus 104. Secondary optical system 242 and charged-particle detection device 244 may be aligned with a secondary optical axis 252 of apparatus 104.

Charged-particle source 202 can emit one or more charged particles, such as electrons, protons, ions, muons, or any other particle carrying electric charges. In some embodiments, charged-particle source 202 may be an electron source. For example, charged-particle source 202 may include a cathode, an extractor, or an anode, wherein primary electrons can be emitted from the cathode and extracted or accelerated to form primary charged-particle beam 210 (in this case, a primary electron beam) with a crossover (virtual or real) 208. For ease of explanation without causing ambiguity, electrons are used as examples in some of the descriptions herein. However, it should be noted that any charged particle may be used in any embodiment of this disclosure, not limited to electrons. Primary charged-particle beam 210 can be visualized as being emitted from crossover 208. Gun aperture 204 can block off peripheral charged particles of primary charged-particle beam 210 to reduce Coulomb effect. The Coulomb effect may cause an increase in size of probe spots.

Source conversion unit 212 can comprise an array of image-forming elements and an array of beam-limit apertures. The array of image-forming elements can comprise an array of micro-deflectors or micro-lenses. The array of image-forming elements can form a plurality of parallel images (virtual or real) of crossover 208 with a plurality of beamlets 214, 216, and 218 of primary charged-particle beam 210. The array of beam-limit apertures can limit the plurality of beamlets 214, 216, and 218. While three beamlets 214, 216, and 218 are shown in FIG. 2, embodiments of the present disclosure are not so limited. For example, in some embodiments, the apparatus 104 may be configured to generate a first number of beamlets. In some embodiments, the first number of beamlets may be in a range from 1 to 1000. In some embodiments, the first number of beamlets may be in a range from 200-500. In an exemplary embodiment, apparatus 104 may generate 400 beamlets.

Condenser lens 206 can focus primary charged-particle beam 210. The electric currents of beamlets 214, 216, and 218 downstream of source conversion unit 212 can be varied by adjusting the focusing power of condenser lens 206 or by changing the radial sizes of the corresponding beam-limit apertures within the array of beam-limit apertures. Objective lens 228 can focus beamlets 214, 216, and 218 onto a wafer 230 for imaging, and can form a plurality of probe spots 270, 272, and 274 on a surface of wafer 230.

Beam separator 222 can be a beam separator of Wien filter type generating an electrostatic dipole field and a magnetic dipole field. In some embodiments, if they are applied, the force exerted by the electrostatic dipole field on a charged particle (e.g., an electron) of beamlets 214, 216, and 218 can be substantially equal in magnitude and opposite in a direction to the force exerted on the charged particle by magnetic dipole field. Beamlets 214, 216, and 218 can, therefore, pass straight through beam separator 222 with zero deflection angle. However, the total dispersion of beamlets 214, 216, and 218 generated by beam separator 222 can also be non-zero. Beam separator 222 can separate secondary charged-particle beams 236, 238, and 240 from beamlets 214, 216, and 218 and direct secondary charged-particle beams 236, 238, and 240 towards secondary optical system 242.

Deflection scanning unit 226 can deflect beamlets 214, 216, and 218 to scan probe spots 270, 272, and 274 over a surface area of wafer 230. In response to the incidence of beamlets 214, 216, and 218 at probe spots 270, 272, and 274, secondary charged-particle beams 236, 238, and 240 may be emitted from wafer 230. Secondary charged-particle beams 236, 238, and 240 may comprise charged particles (e.g., electrons) with a distribution of energies. For example, secondary charged-particle beams 236, 238, and 240 may be secondary electron beams including secondary electrons (energies ≤50 eV) and backscattered electrons (energies between 50 eV and landing energies of beamlets 214, 216, and 218). Secondary optical system 242 can focus secondary charged-particle beams 236, 238, and 240 onto detection sub-regions 246, 248, and 250 of charged-particle detection device 244. Detection sub-regions 246, 248, and 250 may be configured to detect corresponding secondary charged-particle beams 236, 238, and 240 and generate corresponding signals (e.g., voltage, current, or the like) used to reconstruct an SCPM image of structures on or underneath the surface area of wafer 230.

The generated signals may represent intensities of secondary charged-particle beams 236, 238, and 240 and may be provided to image processing system 290 that is in communication with charged-particle detection device 244, primary projection optical system 220, and motorized wafer stage 280. The movement speed of motorized wafer stage 280 may be synchronized and coordinated with the beam deflections controlled by deflection scanning unit 226, such that the movement of the scan probe spots (e.g., scan probe spots 270, 272, and 274) may orderly cover regions of interests on the wafer 230. The parameters of such synchronization and coordination may be adjusted to adapt to different materials of wafer 230. For example, different materials of wafer 230 may have different resistance-capacitance characteristics that may cause different signal sensitivities to the movement of the scan probe spots.

The intensity of secondary charged-particle beams 236, 238, and 240 may vary according to the external or internal structure of wafer 230, and thus may indicate whether wafer 230 includes defects. Moreover, as discussed above, beamlets 214, 216, and 218 may be projected onto different locations of the top surface of wafer 230, or different sides of local structures of wafer 230, to generate secondary charged-particle beams 236, 238, and 240 that may have different intensities. Therefore, by mapping the intensity of secondary charged-particle beams 236, 238, and 240 with the areas of wafer 230, image processing system 290 may reconstruct an image that reflects the characteristics of internal or external structures of wafer 230.

In some embodiments, image processing system 290 may include an image acquirer 292, a storage 294, and a controller 296. Image acquirer 292 may comprise one or more processors. For example, image acquirer 292 may comprise a computer, server, mainframe host, terminals, personal computer, any kind of mobile computing devices, or the like, or a combination thereof. Image acquirer 292 may be communicatively coupled to charged-particle detection device 244 of beam tool 104 through a medium such as an electric conductor, optical fiber cable, portable storage media, IR, Bluetooth, internet, wireless network, wireless radio, or a combination thereof. In some embodiments, image acquirer 292 may receive a signal from charged-particle detection device 244 and may construct an image. Image acquirer 292 may thus acquire SCPM images of wafer 230. Image acquirer 292 may also perform various post-processing functions, such as generating contours, superimposing indicators on an acquired image, or the like. Image acquirer 292 may be configured to perform adjustments of brightness and contrast of acquired images. In some embodiments, storage 294 may be a storage medium such as a hard disk, flash drive, cloud storage, random access memory (RAM), other types of computer-readable memory, or the like. Storage 294 may be coupled with image acquirer 292 and may be used for saving scanned raw image data as original images, and post-processed images. Image acquirer 292 and storage 294 may be connected to controller 296. In some embodiments, image acquirer 292, storage 294, and controller 296 may be integrated together as one control unit.

In some embodiments, image acquirer 292 may acquire one or more SCPM images of a wafer based on an imaging signal received from charged-particle detection device 244. An imaging signal may correspond to a scanning operation for conducting charged particle imaging. An acquired image may be a single image comprising a plurality of imaging areas. The single image may be stored in storage 294. The single image may be an original image that may be divided into a plurality of regions. Each of the regions may comprise one imaging area containing a feature of wafer 230. The acquired images may comprise multiple images of a single imaging area of wafer 230 sampled multiple times over a time sequence. The multiple images may be stored in storage 294. In some embodiments, image processing system 290 may be configured to perform image processing steps with the multiple images of the same location of wafer 230.

In some embodiments, image processing system 290 may include measurement circuits (e.g., analog-to-digital converters) to obtain a distribution of the detected secondary charged particles (e.g., secondary electrons). The charged-particle distribution data collected during a detection time window, in combination with corresponding scan path data of beamlets 214, 216, and 218 incident on the wafer surface, can be used to reconstruct images of the wafer structures under inspection. The reconstructed images can be used to reveal various features of the internal or external structures of wafer 230, and thereby can be used to reveal any defects that may exist in the wafer.

In some embodiments, the charged particles may be electrons. When electrons of primary charged-particle beam 210 are projected onto a surface of wafer 230 (e.g., probe spots 270, 272, and 274), the electrons of primary charged-particle beam 210 may penetrate the surface of wafer 230 for a certain depth, interacting with particles of wafer 230. Some electrons of primary charged-particle beam 210 may elastically interact with (e.g., in the form of elastic scattering or collision) the materials of wafer 230 and may be reflected or recoiled out of the surface of wafer 230. An elastic interaction conserves the total kinetic energies of the bodies (e.g., electrons of primary charged-particle beam 210) of the interaction, in which the kinetic energy of the interacting bodies does not convert to other forms of energy (e.g., heat, electromagnetic energy, or the like). Such reflected electrons generated from elastic interaction may be referred to as backscattered electrons (BSEs). Some electrons of primary charged-particle beam 210 may inelastically interact with (e.g., in the form of inelastic scattering or collision) the materials of wafer 230. An inelastic interaction does not conserve the total kinetic energies of the bodies of the interaction, in which some or all of the kinetic energy of the interacting bodies convert to other forms of energy. For example, through the inelastic interaction, the kinetic energy of some electrons of primary charged-particle beam 210 may cause electron excitation and transition of atoms of the materials. Such inelastic interaction may also generate electrons exiting the surface of wafer 230, which may be referred to as secondary electrons (SEs). Yield or emission rates of BSEs and SEs depend on, e.g., the material under inspection and the landing energy of the electrons of primary charged-particle beam 210 landing on the surface of the material, among others. The energy of the electrons of primary charged-particle beam 210 may be imparted in part by its acceleration voltage (e.g., the acceleration voltage between the anode and cathode of charged-particle source 202 in FIG. 2). The quantity of BSEs and SEs may be more or fewer (or even the same) than the injected electrons of primary charged-particle beam 210.

The images generated by SEM may be used for defect inspection. For example, a generated image capturing a test device region of a wafer may be compared with a reference image capturing the same test device region. The reference image may be predetermined (e.g., by simulation) and include no known defect. If a difference between the generated image and the reference image exceeds a tolerance level, a potential defect may be identified. For another example, the SEM may scan multiple regions of the wafer, each region including a test device region designed as the same, and generate multiple images capturing those test device regions as manufactured. The multiple images may be compared with each other. If a difference between the multiple images exceeds a tolerance level, a potential defect may be identified.

Figure 3A:
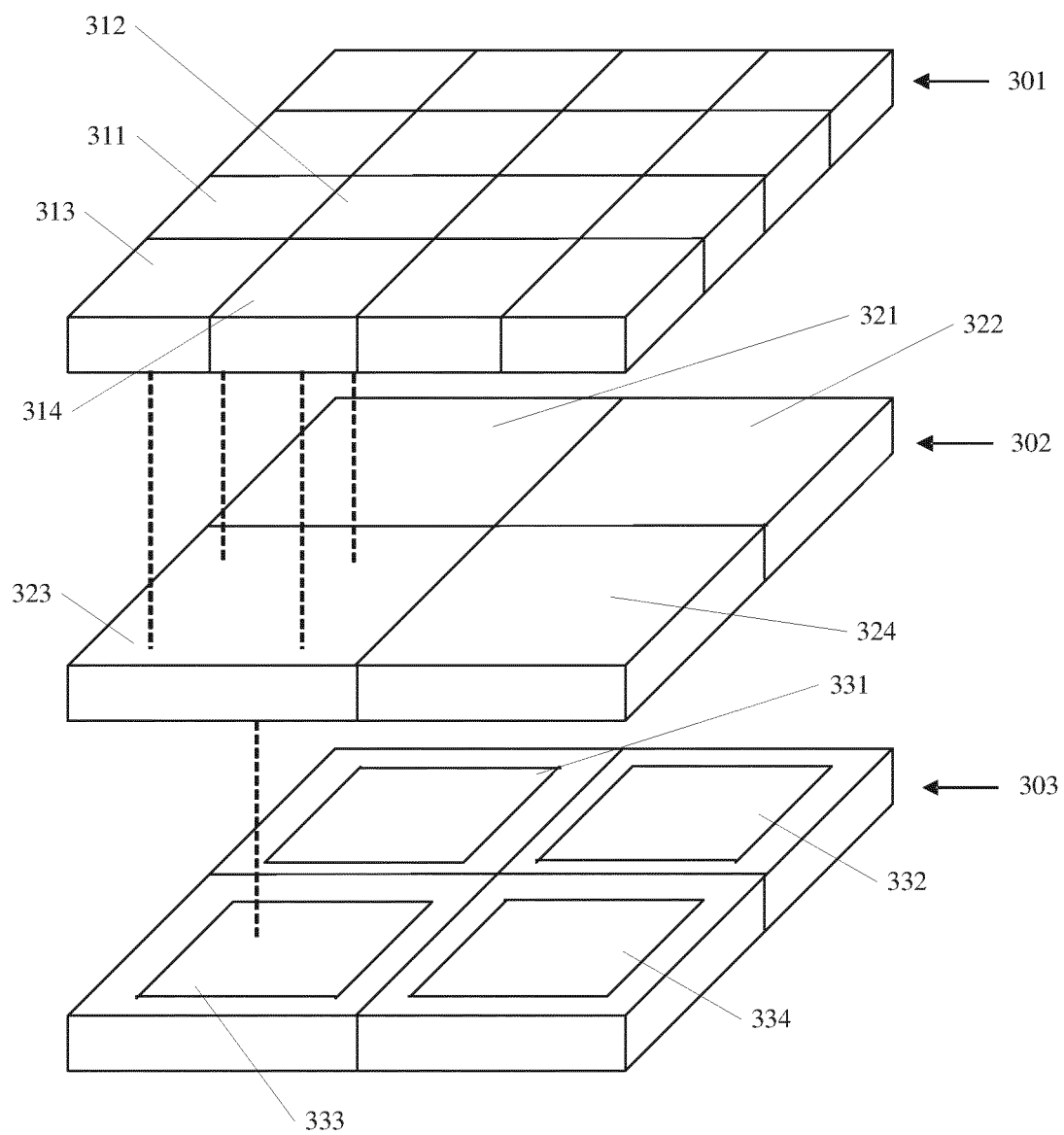
FIG. 3A is a schematic representation of an exemplary structure of a detector, consistent with embodiments of the present disclosure.

FIG. 3A illustrates a schematic representation of an exemplary structure of a detector 300A, consistent with embodiments of the present disclosure. Detector 300A may be provided as charged-particle detection device 244. In FIG. 3A, detector 300A includes a sensor layer 301, a section layer 302, and a readout layer 303. Sensor layer 301 may include a sensor die made up of multiple sensing elements, including sensing elements 311, 312, 313, and 314. In some embodiments, the multiple sensing elements may be provided in an array of sensing elements, each of which may have a uniform size, shape, and arrangement.

Section layer 302 may include multiple sections, including sections 321, 322, 323, and 324. The sections may include interconnections (e.g., wiring paths) configured to communicatively couple the multiple sensing elements. The sections may also include switching elements that may control the communicative couplings between the sensing elements. The sections may further include connection mechanisms (e.g., wiring paths and switching elements) between the sensing elements and one or more common nodes in the section layer. For example, as shown in FIG. 3A, section 323 may be configured to communicatively couple outputs of sensing elements 311, 312, 313, and 314, as shown by the four dashed lines between sensor layer 301 and section layer 302. In some embodiments, section 323 may be configured to output combined signals gathered from sensing elements 311, 312, 313, and 314 as a common output. In some embodiments, a section (e.g., section 323) may be communicatively coupled to sensing elements (e.g., sensing elements 311, 312, 313, and 314) placed directly above the section. For example, section 323 may have a grid of terminals configured to connect with the outputs of sensing elements 311, 312, 313, and 314. In some embodiments, sections 321, 322, 323, and 324 may be provided in an array structure such that they have a uniform size and shape, and a uniform arrangement. Sections 321, 322, 323, and 324 may be square shaped, for instance. In some embodiments, an isolation area may be provided between adjacent sections to electrically insulate them from one another. In some embodiments, sections may be arranged in an offset pattern, such as a tile layout.

Readout layer 303 may include signal processing circuits for processing outputs of the sensing elements. In some embodiments, signal processing circuits may be provided, which may correspond with each of the sections of section layer 302. In some embodiments, multiple separate signal processing circuitry sections may be provided, including signal processing circuitry sections 331, 332, 333, and 334. In some embodiments, the signal processing circuitry sections may be provided in an array of sections having a uniform size and shape, and a uniform arrangement. In some embodiments, the signal processing circuitry sections may be configured to connect with an output from corresponding sections of section layer 302. For example, as shown in FIG. 3A, signal processing circuitry section 333 may be configured to communicatively couple to an output of section 323, as shown by the dashed line between section layer 302 and readout layer 303.

In some embodiments, readout layer 303 may include input and output terminals. Output of readout layer 303 may be connected to a component for reading and interpreting the output of detector 300A. For example, readout layer 303 may be directly connected to a digital multiplexer, digital logic block, controller, computer, or the like.

The sizes of sections and the number of sensing elements associated with a section may be varied. For example, while FIG. 3A illustrates four sensing elements in one section, embodiments of the disclosure are not so limited.

While FIG. 3A illustrates sensor layer 301, section layer 302, and readout layer 303 as multiple discrete layers, it is noted that sensor layer 301, section layer 302, and readout layer 303 need not be provided as separate substrates. For example, a wiring path of section layer 302 may be provided in a sensor die including the multiple sensing elements, or may be provided outside of the sensor die. Wiring paths may be patterned on sensor layer 301. Additionally, section layer 302 may be combined with readout layer 303. For example, a semiconductor die may be provided that includes wiring paths of section layer 302 and signal processing circuits of readout layer 303. Thus, structures and functionalities of the various layers may be combined or divided.

In some embodiments, a detector may be provided in a two-die configuration. However, embodiments of the present disclosure are not so limited. For example, functions of a sensor layer, section layer, and readout layer may be implemented in one die or in a package that may contain one or more dies.

In some embodiments, arrangements of sensor layer 301, section layer 302, and readout layer 303 may correspond with one another in a stacked relationship. For example, section layer 302 may be mounted directly on top of readout layer 303, and sensor layer 301 may be mounted directly on top of section layer 302. The layers may be stacked such that sections within section layer 302 are aligned with signal processing circuitry sections (e.g., sections 331, 332, 333, and 334) of readout layer 303. Furthermore, the layers may be stacked such that one or more sensing elements within sensor layer 301 are aligned with a section in section layer 302. In some embodiments, sensing elements to be associated with a section may be contained within the section. For example, in a plan view of detector 300A, sensing elements (e.g., sensing elements 311, 312, 313, and 314) of a section (e.g., section 323) may fit within the boundaries of the section. Furthermore, individual sections of section layer 302 may overlap with signal processing circuitry sections of readout layer 303. In this manner, predefined areas may be established for associating sensing elements with sections and signal processing circuitry.

Figure 3B:
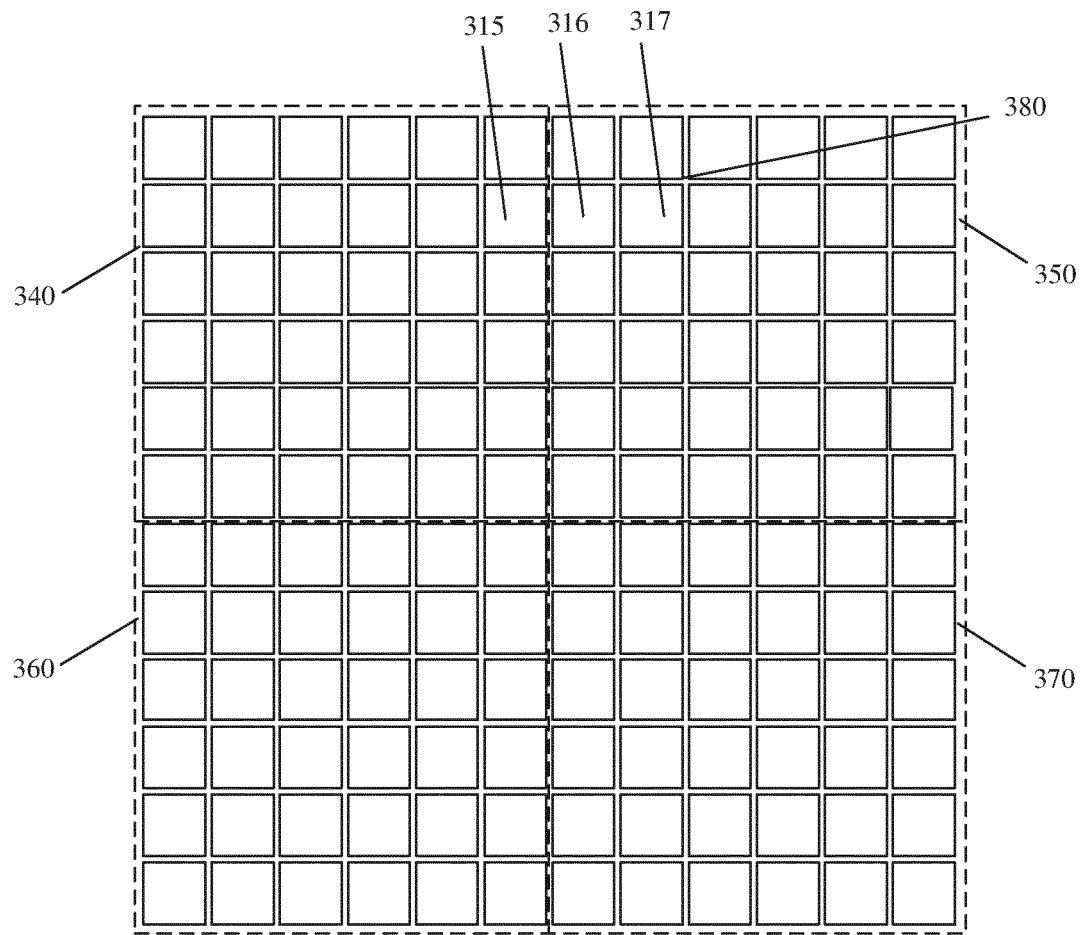
FIG. 3B is a diagram illustrating an exemplary surface of a detector array, consistent with embodiments of the present disclosure.

FIG. 3B illustrates an exemplary structure of a sensor surface 300B that may form a surface of charged-particle detection device 244, consistent with embodiments of the present disclosure. Sensor surface 300B may be provided with multiple sections of sensing elements, including sections 340, 350, 360, and 370, which are represented by the dashed lines. For example, sensor surface 300B may be the surface of sensor layer 301 in FIG. 3A. Each section may be capable of receiving at least a part of a beam spot emitted from a particular location from wafer 230, such as one of secondary charged-particle beams 236, 238, and 240 as shown in FIG. 2.

As shown in FIG. 3B, sensor surface 300B may include an array of sensing elements, including sensing elements 315, 316, and 317. In some embodiments, each of sections 340, 350, 360, and 370 may contain one or more sensing elements. For example, section 340 may contain a first plurality of sensing elements, and section 350 may contain a second plurality of sensing elements, and so on. The first plurality of sensing elements and the second plurality of sensing elements may be mutually exclusive. In some embodiments, a sensing element may be a diode or any element similar to a diode that can convert incident energy into a measurable signal. For example, the sensing elements may include a PIN diode, an avalanche diode, an electron multiplier tube (EMT), or other components.

In FIG. 3B, an area 380 may be provided between adjacent sensing elements. Area 380 may be an isolation area to isolate the sides or corners of neighboring sensing elements from one another. In some embodiments, area 380 may include an insulating material that is different from that of the sensing elements of sensor surface 300B. In some embodiments, area 380 may be provided as a square. In some embodiments, area 380 may not be provided between adjacent sides of sensing elements.

In some embodiments, a field programmable detector array may be provided with sensing elements having switching regions integrated between the sensing elements. For example, detectors may be provided such as some of those examples discussed in PCT Application No. PCT/EP2018/074833, filed on Sep. 14, 2018, the content of which is herein incorporated by reference in its entirety. In some embodiments, a switching region may be provided between sensing elements so that some or more of the sensing elements may be grouped when covered by the same charged-particle beam spot. Circuits for controlling the switching regions may be included in the signal processing circuits of the readout layer (e.g., readout layer 303 in FIG. 3A). As used throughout the present disclosure, the expression "a set of sensing elements" shall mean a group of sensing elements of a first quantity. A first set of sensing elements among the set of sensing elements may refer to a subset of sensing elements within the set. A second set of sensing elements may refer to another subset of sensing elements within the set. The first and second sets may or may not be mutually exclusive. A "group" of sensing elements may refer to sensing elements that are associated with one beam spot projected on a detector surface (e.g., within the boundary of the beam spot). First and second sets of sensing elements may refer to different groups of sensing elements that are associated with different beam spots. The sets of sensing elements need not be restricted to particular "sections" of a detector.

Figure 4A:
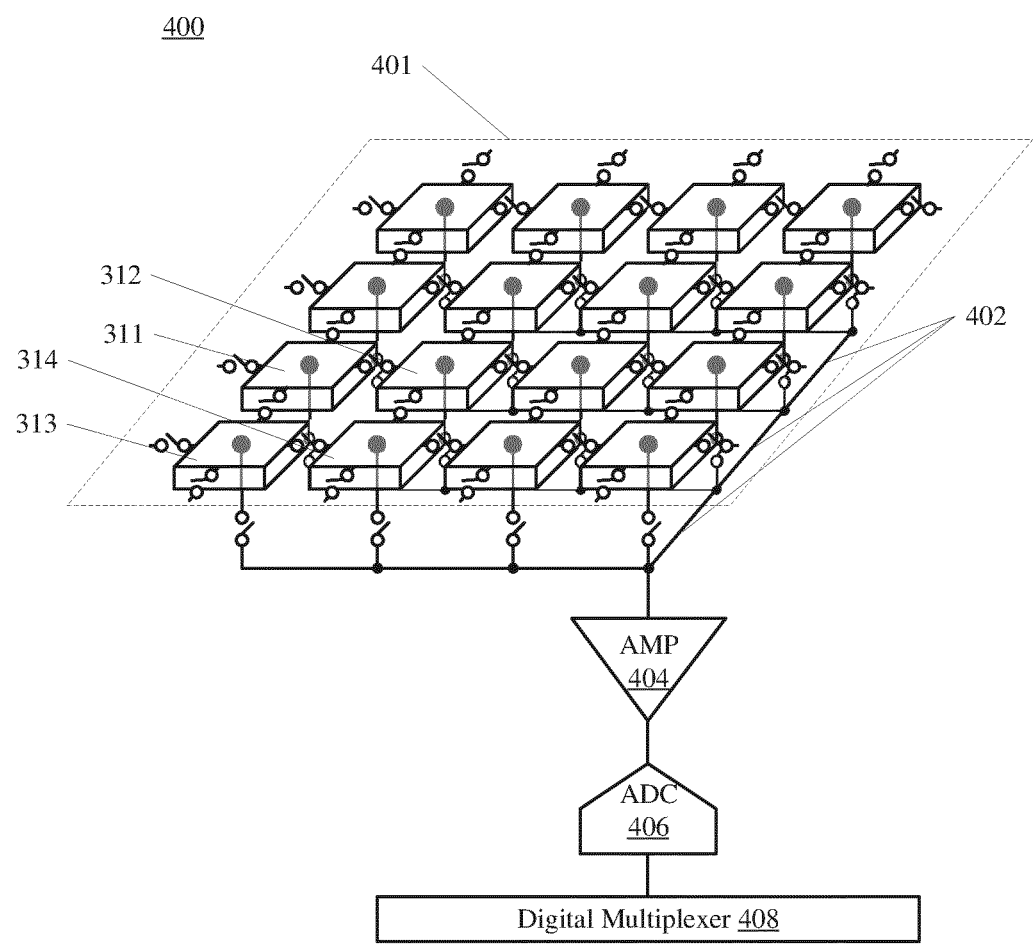
FIGS. 4A-4C are diagrams illustrating an exemplary detector array with switching elements, consistent with embodiments of the present disclosure.

FIG. 4A is a diagram illustrating an exemplary detector array 400 with switching elements, consistent with embodiments of the present disclosure. Detector array 400 may be an example embodiment of detector 300A in FIG. 3A. For example, detector array 400 may include a sensor layer (e.g., similar to sensor layer 301 in FIG. 3A), a section layer (e.g., similar to section layer 302 in FIG. 3A), and a readout layer (e.g., similar to readout layer 303 in FIG. 3A). A region 401 may correspond to one section (e.g., section 323 as shown in FIG. 3A). The sensor layer of detector array 400 may include multiple sensing elements, including sensing elements 311, 312, 313, and 314. In some embodiments, each of the sensing elements of detector array 400 may have a uniform size, shape, and arrangement. The sensing elements of detector array 400 may generate an electric current signal commensurate with the charged particles (e.g., exiting electrons) received in the active areas of the sensing elements. The "active areas" herein may refer to areas of the sensing elements having radiation sensitivity above a predetermined threshold value.

The section layer of detector array 400 may include a base substrate (e.g., a semiconductor substrate, not shown in FIG. 4A) including one or more wiring paths 402. Wiring paths 402 may be configured to communicatively couple the sensing elements of detector array 400. As shown in FIG. 4A, detector array 400 includes a 4×4 array of sensing elements in region 401, including sensing elements 311, 312, 313, and 314. In FIG. 4A, the section layer of detector array 400 may include inter-element switching elements between any two adjacent sensing elements. The section layer of detector array 400 may also include inter-element switching elements communicatively coupled to edges of neighboring sensing elements. Wiring paths 402 may be configured to communicatively couple to outputs of sensing elements (e.g., sensing elements 311, 312, 313, and 314) in region 401. For example, a grid of terminals (shown as round black dots at the centers of the sensing elements) may be provided, and wiring paths 402 may be configured to connect with the outputs of sensing elements 311, 312, 313, and 314 via such terminals. In some embodiments, wiring paths 402 may be provided in the section layer of detector array 400. In FIG. 4A, wiring paths 402 are communicatively coupled to the above sensing elements (e.g., sensing elements 311, 312, 313, and 314). In FIG. 4A, element-bus switching elements may be provided between the outputs of the sensing elements and wiring paths 402. In some embodiments, the element-bus switching elements may be provided in the section layer of detector array 400.

Figure 4B:
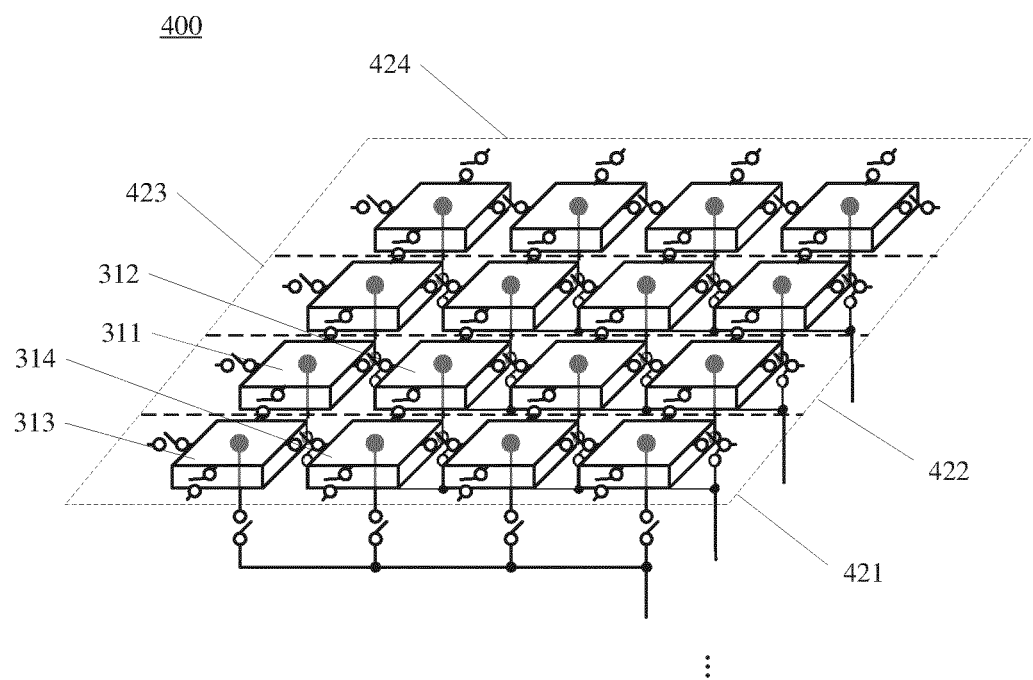
Figure 4C:
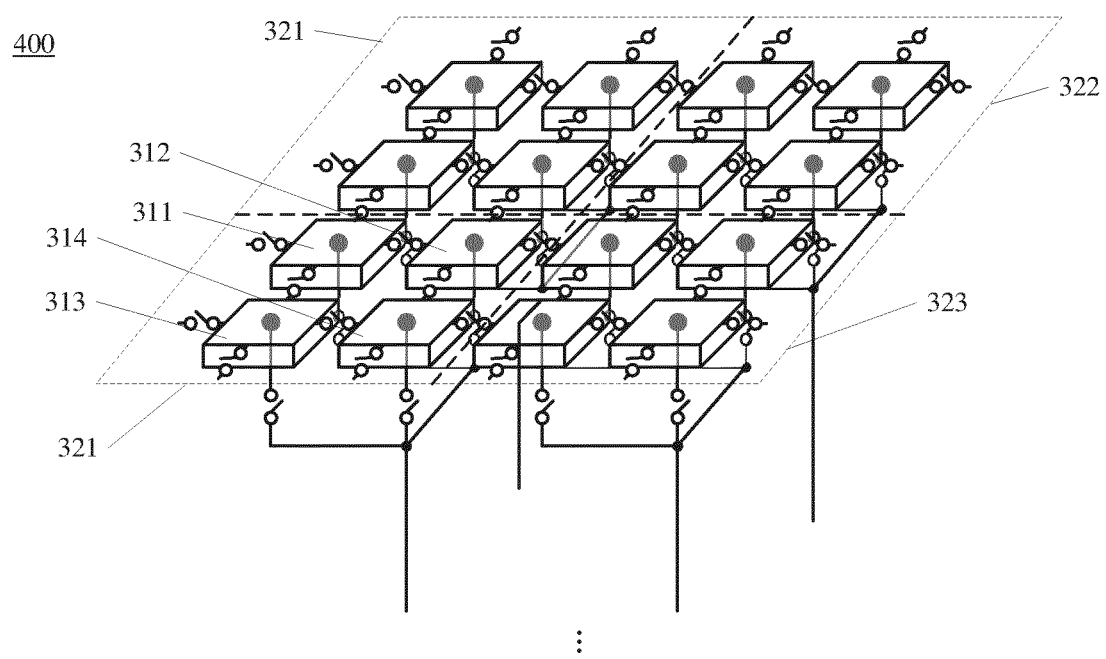

In some embodiments, multiple sections may be provided, and sensing elements of one section may be connected by a wiring path. As shown in FIG. 4B, detector array 400 includes section 421, section 422, section 423, and section 424 that may be arranged in rows. As shown in FIG. 4C, detector array 400 includes a section 323 having 2×2 sensing elements, including sensing elements 311, 312, 313, and 314.

In some embodiments, wiring paths 402 may include lines of conductive material printed on the base substrate, flexible wires, bonding wires, or the like. In some embodiments, switching elements may be provided so that outputs of individual sensing elements can be connected or disconnected with the common output of a section (e.g., section 323). In some embodiments, the section layer of detector array 400 may further include corresponding circuits for controlling the switching elements. In some embodiments, switching elements may be provided in a separate switch-element matrix that may itself contain circuits for controlling the switching elements.

The readout layer of detector array 400 may include signal conditioning circuits for processing outputs of the sensing elements. In some embodiments, the signal conditioning circuits may convert the generated current signal into a voltage that may represent the intensity of a received beam spot, or may amplify the generated current signal into an amplified current signal. The signal conditioning circuit may include, for example, an amplifier 404 and one or more analog switching elements (not shown in FIG. 4A). The amplifier 404 may be a high speed transimpedance amplifier, a current amplifier, or the like. In FIG. 4A, amplifier 404 may be communicatively coupled to the common output of section 321 for amplifying the output signals of the sensing elements of section 321. In some embodiments, amplifier 404 may be a single-stage or a multi-stage amplifier. For example, if amplifier 404 is a multi-stage amplifier, it may include a pre-amplifier and a post-amplifier, or include a front-end stage and a post stage, or the like. In some embodiments, amplifier 404 may be a variable gain amplifier, such as a variable gain transimpedance amplifier (VG-TIA), a variable gain charge transfer amplifier (VGCTA), or the like. The signal conditioning circuit may be coupled to a signal path that may include, for example, an analog-to-digital converter (ADC) 406. In FIG. 4A, ADC 406 may be communicatively coupled to the output of the signal conditioning circuit (e.g., including amplifier 404) to convert the analog output signals of the signal conditioning circuit to digital signals. The readout layer of detector array 400 may also include other circuits for other functions. For example, the readout layer of detector array 400 may include switch-element actuating circuits that may control the switching elements between the sensing elements. For ease of explanation without causing ambiguity, the signal path between the sensing elements and ADC 406 may be referred to as an "analog signal path." For example, the analog signal path in FIG. 4A includes the above-described signal conditioning circuit (e.g., including amplifier 404). The input of the analog signal path is communicatively coupled to the sensing elements, and the output of the analog signal path is communicatively coupled to ADC 406.

In some embodiments, ADC 406 may include output terminals communicatively coupled to a component (e.g., a component inside or outside the readout layer of detector array 400) for reading and interpreting the digital signal converted by ADC 406. In FIG. 4A, ADC 406 is communicatively coupled to a digital multiplexer 408. In some embodiments, digital multiplexer 408 may be arranged in the readout layer of detector array 400. Digital multiplexer 408 may receive multiple input signals and convert them as an output signal. The output signal of digital multiplexer 408 may be converted back to the multiple input signals. The output signal of digital multiplexer 408 may be further transmitted to a data processing stage (e.g., image processing system 290 in FIG. 2).

Figure 5:
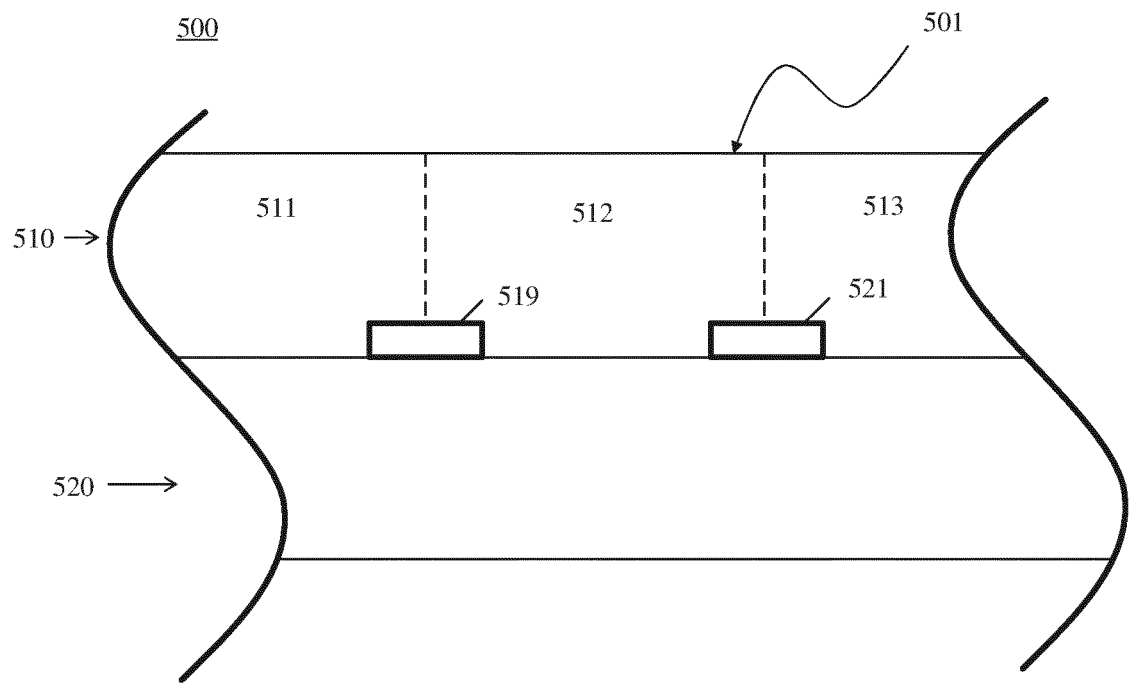
FIG. 5 is a diagram illustrating a cross-sectional view of a layer structure of a detector, consistent with embodiments of the present disclosure.

FIG. 5 is a diagram illustrating a cross-sectional view of a layer structure of a detector 500, consistent with embodiments of the present disclosure. Detector 500 may be provided as charged-particle detection device 244 in a charged-particle beam tool 104 as shown in FIG. 2. Detector 500 may be configured to have multiple layers stacked in a thickness direction, the thickness direction being substantially parallel to an incidence direction of a charged-particle beam. In some embodiments, detector 500 may be provided such as some of those examples discussed in PCT Application No. PCT/EP2018/074834, filed on Sep. 14, 2018, the content of which is herein incorporated by reference in its entirety.

In FIG. 5, detector 500 may include a sensor layer 510 and a circuit layer 520. In some embodiments, sensor layer 510 may represent sensor layer 301 in FIG. 3A, and circuit layer 520 may represent section layer 302 and readout layer 303 in FIG. 3A. For example, circuit layer 520 may include interconnects (e.g., metal lines), and various electronic circuit components. As another example, circuit layer 520 may include a processing system. Circuit layer 520 may also be configured to receive the output current detected in sensor layer 510. In some embodiments, sensor layer 510 may represent sensor layer 301 and section layer 302 in FIG. 3A, and circuit layer 520 may represent readout layer 303 in FIG. 3A. In some embodiments, detector 500 may include layers in addition to sensor layer 301, section layer 302, and readout layer 303.

In some embodiments, sensor layer 510 may be provided with a sensor surface 501 for receiving incident charged particles. Sensing elements, including sensing elements 511, 512, and 513 (differentiated by dashed lines), may be provided in sensor layer 510. For example, sensor surface 501 may be similar to sensor surface 300B in FIG. 3B. In FIG. 5, switching elements, including switching elements 519 and 521, may be provided between adjacent sensing elements in a horizontal direction in the cross-sectional view. Switching elements 519 and 521 may be embedded in sensor layer 510. In some embodiments, sensing elements 511, 512, and 513 may be among the sensing elements (e.g., sensing elements 311, 312, 313, and 314) of detector array 400 in FIG. 4A, and switching elements 519 and 521 may be among the switching elements between the sensing elements of detector array 400 in FIG. 4A.

In some embodiments, sensing elements 511, 512, and 513 may be separated by an isolation area (indicated by the dashed lines) extending in the thickness direction. For example, sides of sensing elements 511, 512, and 513 that are parallel to the thickness direction may be isolated from each other by the isolation areas (e.g., area 380 in FIG. 3B).

In some embodiments, sensor layer 510 may be configured as one or more diodes where sensing elements 511, 512, and 513 are similar to sensing elements 315, 316, and 317 of FIG. 3B. Switching elements 519 and 521 may be configured as transistors (e.g., MOSFETs). Each of sensing elements 511, 512, 513 may include outputs for making electrical connections to circuit layer 520. For example, the outputs may be integrated with switching elements 519 and 521, or may be provided separately. In some embodiments, the outputs may be integrated in a bottom layer of sensor layer 510 (e.g., a metal layer).

Although FIG. 5 depicts sensing elements 511, 512, and 513 as discrete units when viewed in cross-section, such divisions may not actually be physical. For example, the sensing elements of detector 500 may be formed by a semiconductor device constituting a PIN diode device that can be manufactured as a substrate with multiple layers including a P-type region, an intrinsic region, and an N-type region. In such an example, sensing elements 511, 512, 513 may be contiguous in cross-sectional view. In some embodiments, the switching elements (e.g., switching elements 519 and 521) may be integrated with the sensing elements.

In some embodiments, switching elements may be integrated within the sensor layer, integrated within other layers, or may be provided partially or fully in existing layers. In some embodiments, for example, the sensor layer may contain wells, trenches, or other structures, wherein the switching elements are formed in those structures.

In some embodiments, the switching elements (e.g., switching elements 519 and 521) of detector 500 may be provided outside of sensor layer 510. For example, the switching elements may be embedded in circuit layer 520 (not shown in FIG. 5). In some embodiments, the switching elements (e.g., switching elements 519 and 521) of detector 500 may be formed in a separate die (e.g., a switch die). For example, the switch die (not shown in FIG. 5) may be sandwiched between and be communicatively connected to sensor layer 510 and circuit layer 520.

Figure 6:
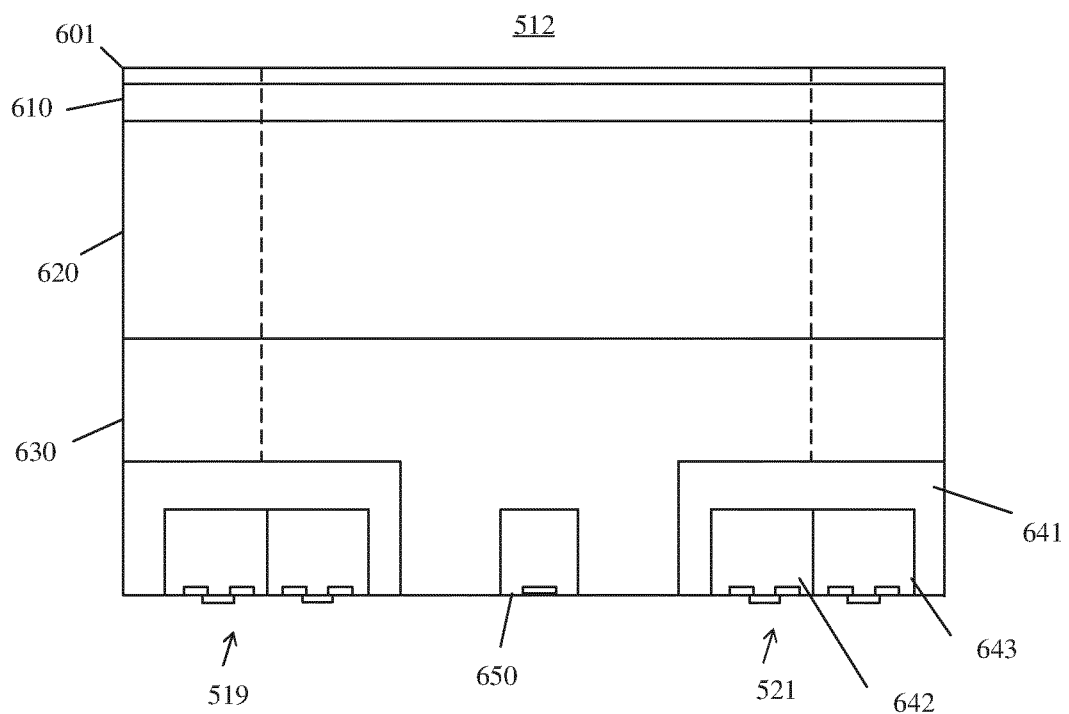
FIG. 6 is a diagram illustrating a cross-sectional view of a sensing element of a detector, consistent with embodiments of the present disclosure.

FIG. 6 is a diagram illustrating a cross-sectional view of sensing element 512 of detector 500, consistent with embodiments of the present disclosure. In FIG. 6, sensing element 512 may include a P-well and an N-well for forming switching elements and other active or passive elements that may be communicatively coupled to other components of sensor layer 510 or circuit layer 520. Although FIG. 6 only shows one full sensing element 512, it is understood that sensor layer 510 may be made up of multiple sensing elements similar to sensing element 512 (e.g., sensing elements 511 and 513), which may be contiguous in cross-sectional view.

In some embodiments, sensing element 512 may include a diode device having a surface layer 601, a P-type region 610, a P-epitaxial region 620, an N-type region 630, and other components. Surface layer 601 may form a detection surface (e.g., an active area) of a detector that receives incident charged particles. For example, surface layer 601 may be a metal layer (e.g., formed by aluminum or other conductive materials). On an opposite side from surface layer 601, there may be provided an electrode 650 as a charge collector. Electrode 650 may be configured to output a current signal representing the number of charged particles received in the active area of sensing element 512.

In some embodiments, as shown in FIG. 6, switching elements 519 and 521 may be formed by metal oxide semiconductor (MOS) devices. For example, multiple MOS devices may be formed in a back side of N-type region 630 in FIG. 6, and the back side of N-type region 630 may be in contact with sensor layer 510 in FIG. 5. As an example of a MOS device, there may be provided a deep P-well 641, an N-well 642, and a P-well 643. In some embodiments, the MOS devices may be fabricated by etching, patterning, and other processes and techniques. It will be understood that various other devices may be used, such as bipolar semiconductor devices, etc., and devices may be fabricated by various processes.

In operation of sensing element 512, when charged particles (e.g., secondary charged-particle beams 236, 238, and 240 in FIG. 2) impinge on surface layer 601, the body of sensing element 512, including, e.g., a depletion region, may be flooded with charge carriers generated from the impinged charged particles. Such depletion region may extend through at least a portion of the volume of the sensing element. For example, the charged particles may be electrons, and the impinged electrons may create and energize electron-hole pairs in a depletion region of the sensing element. The energized electrons among the electron-hole pairs may have further energy such that they may also generate new electron-hole pairs. Electrons generated from the impinged charged particles may contribute to signal generated in each sensing element.

With reference to FIG. 6, a depletion region in sensing element 512 may include an electric field between P-type region 610 and N-type region 630, and the electrons and the holes may be attracted by P-type region 610 and N-type region 630, respectively. When the electrons reach P-type region 610 or when the holes reach N-type region 630, a detection signal may be generated. Thus, sensing element 512 may generate an output signal, such as current, when a charged particle beam is incident on sensing element 512. Multiple sensing elements may be connected, and a group of sensing elements may be used to detect intensity of a charged particle beam spot. When a charged particle beam spot covers multiple adjacent sensing elements (e.g., sensing elements 511, 512, and 513), the sensing elements may be grouped together ("merged") for collecting current. For example, the sensing elements may be merged by turning on switching elements (e.g., switching elements 519 and 521) between them. Signals from sensing elements in a group may be collected and sent to a signal conditioning circuit connected to the group. The number of sensing elements in a group may be an arbitrary number related to the size and shape of the beam spot. The number may be 1 or greater than 1.

In some embodiments, a detector may be configured so that individual sensing elements may communicate with external components via, for example, signal or data lines and address signals. A detector may be configured to actuate switching elements so that two or more sensing elements may be merged, and their output current or voltage may be combined. As can be seen in FIGS. 5-6, with the switch-element design between the sensing elements, the sensing elements may be provided without physical isolation areas (e.g., area 380 in FIG. 3B). Thus, when sensing element 512 is activated, all of the area under surface layer 601 may become active. When no physical isolation area is provided between adjacent sensing elements, dead area between them may be minimized or eliminated.

Figure 7:
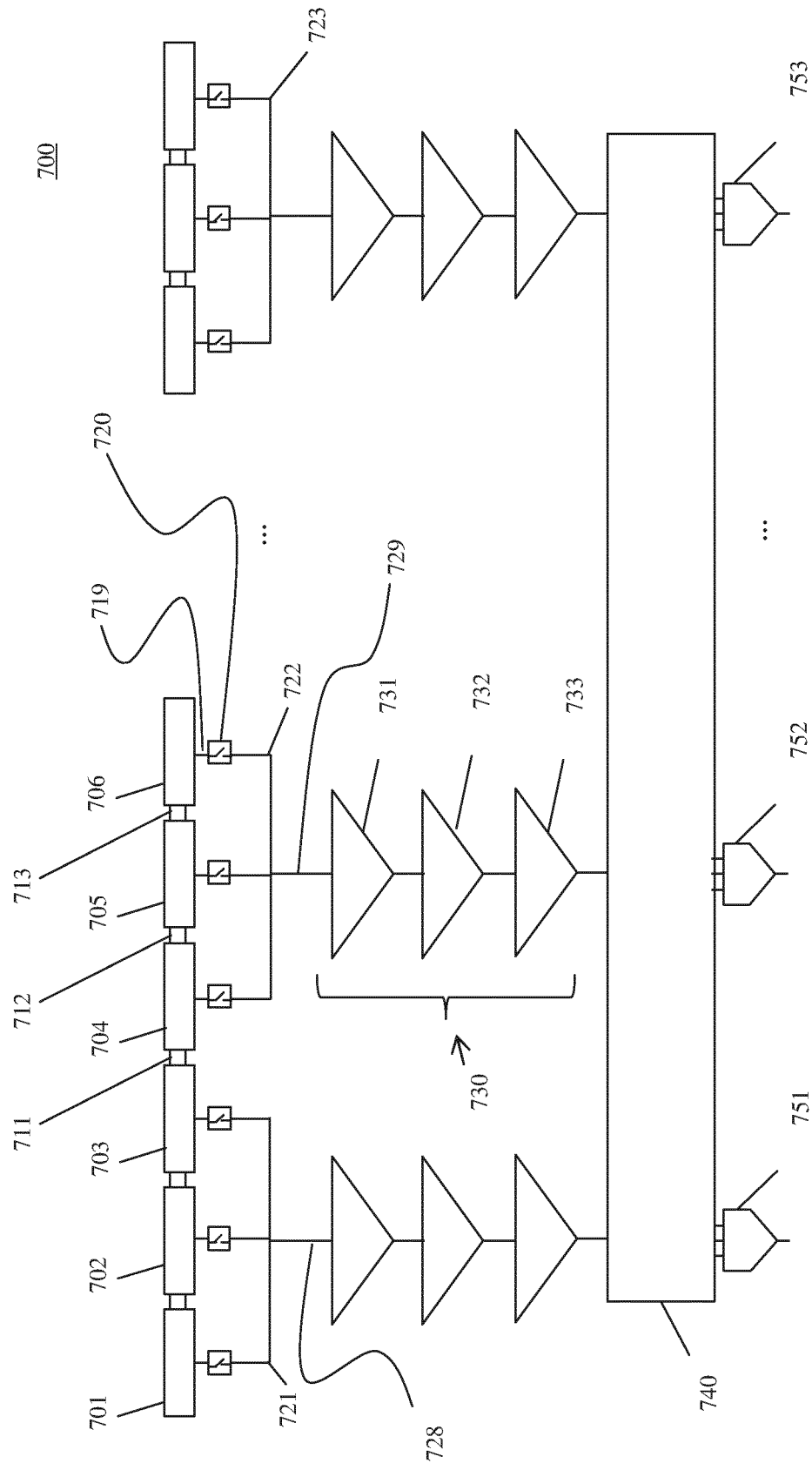
FIG. 7 is a diagram representing an exemplary section arrangement of a detector, consistent with embodiments of the present disclosure.

FIG. 7 is a diagram representing an exemplary section arrangement of a detector 700, consistent with embodiments of the present disclosure. For example, detector 700 may be an embodiment of detector 300A in FIG. 3A, detector array 400 in FIG. 4A, or detector 500 in FIG. 5. As shown in FIG. 7, detector 700 may include multiple sensing elements, including sensing elements 701, 702, 703, 704, 705, and 706. In some embodiments, the multiple sensing elements may be part of a sensor layer that may form a detection surface (e.g., sensor surface 300B in FIG. 3B) of charged-particle detection device 244 in FIG. 2. The sensor layer may include switching elements between adjacent sensing elements (e.g., similar to switching elements 519 and 521 in FIG. 6), including inter-element switching elements 711, 712, and 713. In some embodiments, when being turned on, the switching elements may be configured to group two or more adjacent sensing elements together.

In FIG. 7, detector 700 may include multiple sections (e.g., similar to sections 321, 322, 323, and 324 in FIG. 3A). Each of the sections may include one or more sensing elements, and wiring paths (e.g., similar to wiring paths 402 in FIG. 4A) between the sensing elements, and a common output. In some embodiments, the wiring paths may include a common wire or a shared signal path. For example, as shown in FIG. 7, wiring paths 721 may be communicatively connected to sensing elements 701, 702, and 703, and to a common output 728. Wiring paths 721, sensing elements 701-703, and common output 728 may belong to a first section. Wiring paths 722 may be communicatively connected to sensing elements 704, 705, and 706, and to a common output 729. Wiring paths 722, sensing elements 704-706, and common output 729 may belong to a second section. An output (e.g., output 719) of a sensing element (e.g., sensing element 706) may be communicatively coupled to corresponding wiring paths (e.g., wiring paths 722) via an element-bus switching element (e.g., element-bus switching element 720). In some embodiments, element-bus switching element 720 may be implemented using techniques similar to switching elements 519 and 521 as described in FIG. 6. In some embodiments, when sensing element 706 is not in use, element-bus switching element 720 may be disconnected to reduce noise, parasitic capacitance, or other technical effects from sensing element 706.

In FIG. 7, the sections (e.g., the first section including sensing elements 701-703 or the second section including sensing elements 704-706) may be configured to output electrical signals to signal processing circuits and further circuit elements. For example, wiring paths 722 may output electrical signals to signal processing circuitry 730 via common output 729.

Signal processing circuitry 730 may include one or more signal processing circuits for processing electrical signals output by wiring paths 722. For example, signal processing circuitry 730 may include a pre-amplifier 731, a post-amplifier 732, and a data converter 733. For example, pre-amplifier 731 may be a transimpedance amplifier (TIA), a charge transfer amplifier (CTA), a current amplifier, or the like. Post-amplifier 732 may be a variable gain amplifier (VGA) or the like. Data converter 733 may be an analog-to-digital converter (ADC), which may convert an analog voltage or an analog current to a digital value. In some embodiments, pre-amplifier 731 and post-amplifier 732 may be combined as a single amplifier (e.g., amplifier 404 in FIG. 4A), and data converter 733 may include ADC 406 in FIG. 4A.

Detector 700 may include a digital switch 740. In some embodiments, digital switch 740 may include a switch-element matrix. In some embodiments, digital switch 740 may include a multiplexer (e.g., digital multiplexer 408 in FIG. 4A). For example, the multiplexer may be configured to receive a first number of inputs and generate a second number of outputs, in which the first number and the second number may be the same or different. The first number may correspond to parameters (e.g., a total number of sections) of detector 700, and the second number may correspond to parameters (e.g., number of beamlets generated from charged-particle source 202 in FIG. 2) of beam tool 104 of FIGS. 1-2. Digital switch 740 may communicate with external components via data lines and address signals. In some embodiments, digital switch 740 may control data read/write. Digital switch 740 may also include circuitry for controlling the inter-element switching elements (e.g., inter-element switching elements 711, 712, and 713). In FIG. 7, digital switch 740 may generate output signals via multiple data channels, including data channels 751, 752, and 753. In some embodiments, the data channels of digital switch 740 may be further connected to other components, such as image processing system 290. Thus, multiple sections of detector 700 may act as independent data channels for detector signals.

It is noted that various components may be inserted at various stages in the representation of FIG. 7. In some embodiments, one or more of the above components of detector 700 may be omitted. In some embodiments, other circuits may be provided for other functions. For example, switch-element actuating circuits (not shown in FIG. 7) may be provided to control inter-element switching elements (e.g., inter-element switching elements 711, 712, and 713) for connecting the sensing elements. In some embodiments, an analog output line (not shown in FIG. 7) may be provided, which can be read by an analog path. For example, the analog output line may be parallel to data converter 733 for receiving output of post-amplifier 732. For another example, the analog output line may replace data converter 733.

Figure 8:
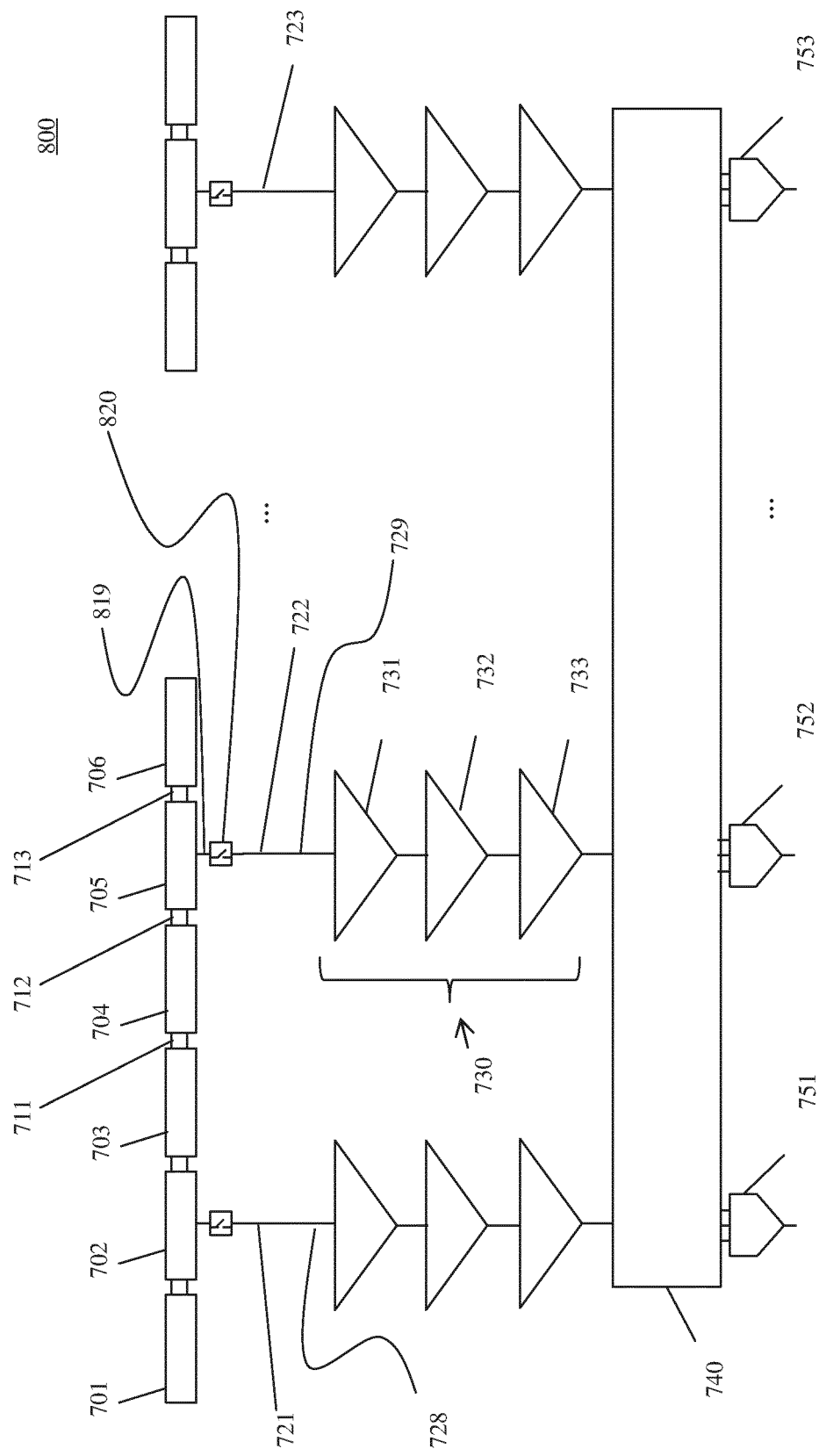
FIG. 8 is a diagram representing another exemplary section arrangement of a detector, consistent with embodiments of the present disclosure.

FIG. 8 is a diagram representing another exemplary section arrangement of detector 800, consistent with embodiments of the present disclosure. Detector 800 may be similar to detector 700 except that sensing elements (e.g., sensing elements 704, 705, and 706) associated with a section may be communicatively coupled to associated wiring paths (e.g., wiring paths 722) via a common wiring path (e.g., common wiring path 819) and a common switching element (e.g., common switching element 820). In some embodiments, common switching element 820 may be implemented using techniques similar to switching elements 519 and 521 as described in FIG. 6. For example, as shown in FIG. 8, if a charged-particle beam is incident on sensing elements 704, 705, and 706, sensing elements 704, 705, and 706 may generate detection signals. Sensing element 705 may directly output its detection signal to common wiring path 819. Sensing elements 704 and 706 may route their detection signals to sensing element 705 through inter-element switching elements 712 and 713, respectively, which may be further routed to common wiring path 819 via sensing element 705. Such a design may simplify manufacturing of a detector. As a comparison, a design that uses multiple wiring paths and switching elements between the sensing elements and sections (e.g., the design of detector 700 in FIG. 7) may provide configuration flexibility to group sensing elements because an output of a section is not fixed at any specific sensing element (e.g., sensing element 705 in FIG. 8) of that section. In addition, designs such as that of detector 700 in FIG. 7 may enhance simplicity in reading the output of individual sensing elements. To acquire the beam projection of secondary electron beams, it may be advantageous to read out the output of each sensing element so that the image of the projection pattern may be acquired.

Figure 9:
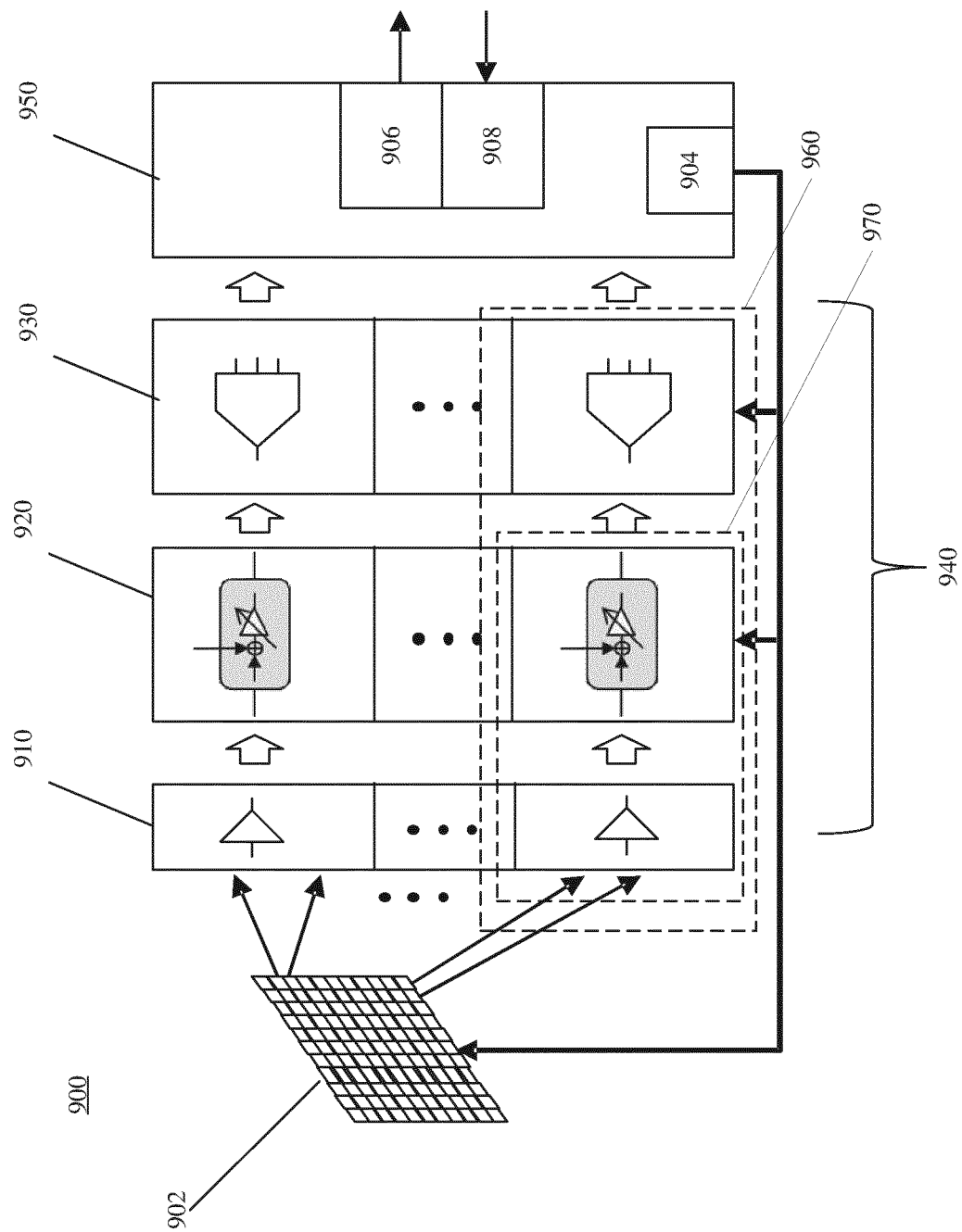
FIG. 9 is a diagram representing a detection system, consistent with embodiments of the present disclosure.

FIG. 9 is a diagram representing a detection system 900, consistent with embodiments of the present disclosure. In some embodiments, detection system 900 may be an embodiment of detection device 244 in FIG. 2. Detection system 900 may include sensing elements 902 (e.g., similar to the sensing elements as described in FIGS. 3A-8) and processing circuits 940 (e.g., similar to signal processing circuitry 730 in FIGS. 7-8). Processing circuits 940 may be communicatively coupled to a digital interface 950 (e.g., similar to digital switch 740 in FIGS. 7-8). Sensing elements 902 may form a sensor surface (e.g., sensor surface 300B of FIG. 3B), and may be segmented into sections (e.g., similar to the sections as described in FIGS. 3A-3B or FIGS. 7-8). Processing circuits 940 may include a first processing circuit array 910 (e.g., including pre-amplifier 731 in FIGS. 7-8) for processing outputs of sensing elements 902, a second processing circuit array 920 (e.g., including post-amplifier 732 in FIGS. 7-8) for providing gains and offset controls, and an ADC array 930 (e.g., including data converter 733 in FIGS. 7-8) for converting analog signals to digital signals. The first processing circuit array 910 and the second processing circuit array 920 may form signal conditioning circuits in processing circuits 940. Each section of processing circuits 940 may be communicatively coupled to a section of sensing elements 902, which may be orderly, communicatively coupled to a unit of first processing circuit array 910, a unit of second processing circuit array 920, and a unit of ADC array 930, forming a signal path (e.g., signal path 960). Such a signal path may receive output signals from the section of sensing elements 902 and generate a charged-particle detection current representing the intensity of at least a portion of a charged-particle beam spot incident on the section of sensing elements 902. The charged-particle detection data may be output to digital interface 950. In FIG. 9, signal path 960 includes an analog signal path 970, which includes the unit of first processing circuit array 910 and the unit of second processing circuit array 920.

Digital interface 950 may include a controller 904. Controller 904 may communicate with ADC array 930, second processing circuit array 920, and sensing elements 902. Digital interface 950 can also send and receive communications from a deflection and image control unit (not shown in FIG. 9) via, for example, a transceiver. The transceiver may include a transmitter 906 and receiver 908. In some embodiments, controller 904 may control the image signal process of detection system 900.

Several challenges exist in further improving the performance, capability, and adaptability of the detectors as described with reference to FIGS. 3A-9. Typically, those challenges may be related to one or more of the processing bandwidth that represents how many signals (e.g., analog signals or digital signals) the detector can process in parallel, the digital signal bandwidth that represents the top speed of data communication and the processing power of a digital system, the analog signal bandwidth that represents the detection capability of the detector and fineness of the inspection results, or the pixel rate that represents how fast the detector can process digital signals.

The analog signal bandwidth of the detector may be limited by parasitic parameters. For example, when a beam (e.g., secondary charged-particle beam 236, 238, or 240 in FIG. 2) impinging on a sensor surface (e.g., sensor surface 300B in FIG. 3B) of a detection device (e.g., detection device 244) has an extra-large spot size, a large number of sensing elements (e.g., the sensing elements as described in FIGS. 3A-8) of the detection device may be involved to detect the beam. In some cases, if the beam impinges on multiple sections of the sensor surface, sensing elements of those sections (e.g., the sections as described in FIGS. 3A-3B, FIGS. 4B-4C, or FIGS. 7-8) may be involved to detect the beam. As another example, when sensing elements are hardwired together in the detection device, even when a beam impinges on only one sensing element of the sensor surface, all sensing elements hardwired together may be activated for detection. However, the more components being involved in detecting a beam, the more parasitic parameters (e.g., stray capacitance) that may be incurred in the signal conditioning circuits, which may dramatically reduce analog signal bandwidth of the analog signal paths (e.g., analog signal path 970 in FIG. 9) of the detection device. In some cases, when multiple sensing elements are involved for detection, the stray capacitance associated with the interconnections (e.g., switching elements) between sensing elements and input of the signal conditioning circuits may also be large, which may reduce the analog signal bandwidth of the amplifiers. Moreover, such dramatic reduction of the analog signal bandwidth may degrade imaging performance. For example, a blurred image may be produced, and a detector may not be able to fulfill a requirement for high pixel rate.

The data processing bandwidth of the detector may be limited by the component capability or the circuit design of the detector in some applications. Many existing detection devices may have only one ADC in each signal path, which may fail to meet some demands in some applications. For example, some applications involve high-density beams, which may not need high pixel rates for data processing. In such cases, a detection device may need a large number of signal paths for a small region of the detection device. However, the signal paths of the detection device may be easily exhausted even if high-data-rate ADCs are not needed to detect the high-density beams. As another example, some applications involve large-spot beams, each of which may generate a large amount of detection signals and may need high pixel rates for data processing. In those cases, a detection device may need high-data-rate ADCs for its signal paths and a high-bandwidth data channel. To provide a high pixel rate for each large-spot beam, the detection device may use multiple signal paths for the large-spot beam. However, the signal paths of the detection device may still be easily exhausted in such cases, and even if the signal paths are sufficient, the data processing bandwidth of the data channel may still be easily exhausted due to the large data amount. As another example, some applications involve low-density beams but each beam requires high pixel rate for detection. In those cases, a detection device may need high-pixel-rate ADCs, which may cause higher costs in design and manufacturing. In some applications, some or all of the above-described challenges may co-exist. Existing designs of detection devices may lack adaptability to address the above challenges.

The pixel rate of the detector may be limited by many factors, including the analog signal bandwidth and the specifications of the components of the detector. For example, the ADCs in the readout circuits may have a maximum sampling rate that cannot support the needed pixel rate. Upgrading the limiting components to more advanced components may incur significant costs in research, development, and manufacturing. Therefore, low-cost solutions to improve the pixel rate of the detector are long strived for.

The performance adaptability of the detector may be limited by one-directional optimization. The design of the detector (e.g., sensor layer 301, section layer 302, and readout layer 303 in FIG. 3A) may be optimized for some applications, but such optimization may deteriorate the performance of the detector in some other applications.

Figure 10:
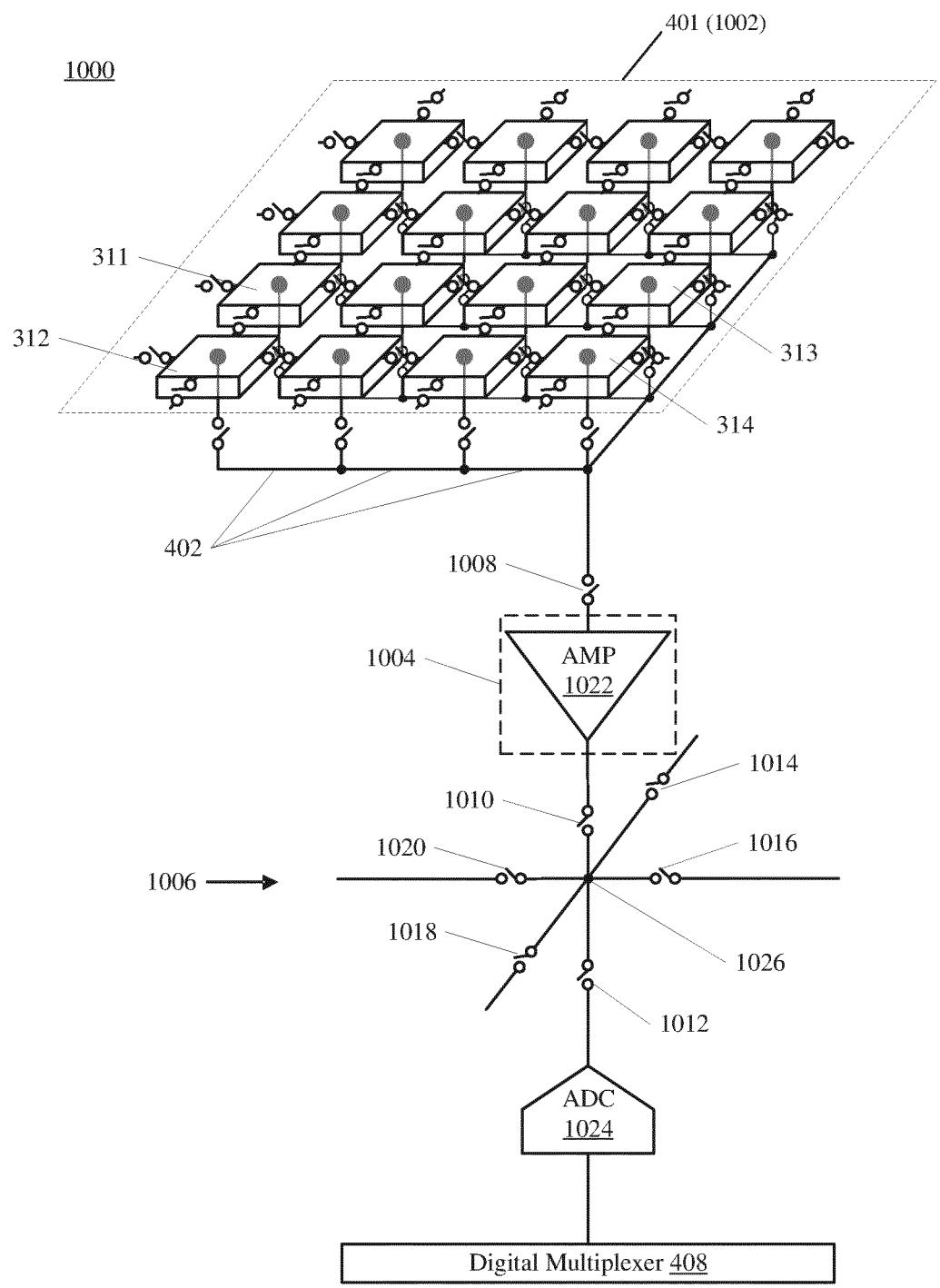
FIG. 10 is a diagram illustrating a detector array having an exemplary architecture, consistent with embodiments of the present disclosure.

An exemplary architecture of a detector array is provided in this disclosure which may help to alleviate some or all of the above-mentioned problems. FIG. 10 is a diagram illustrating a detector array 1000 with an exemplary architecture, consistent with embodiments of the present disclosure. The architecture of FIG. 10 may be used in either a single-beam inspection tool or a multibeam inspection tool (e.g., beam tool 104 in FIG. 2). Detector array 1000 may include some similar components as detector array 400 in FIG. 4A, including a region 401, sensing elements 311, 312, 313, and 314, wiring paths 402, and digital multiplexer 408. Similar to FIG. 4A, detector array 1000 may include multiple sections, including a section 1002 that corresponds to region 401 in FIG. 10. Section 1002 includes 4×4 sensing elements, including sensing elements 311, 312, 313, and 314. Detector array 1000 also includes an analog signal path 1004 associated with section 1002, which starts from the output of section 1002 and ends at the input of an interconnection layer 1006. Analog signal path 1004 includes an amplifier 1022. In some embodiments, similar to analog signal path 970 in FIG. 9, analog signal path 1004 may include, additionally or alternatively, other components. As shown in FIG. 10, section 1002 is associated with analog signal path 1004 (including amplifier 1022) and an ADC 1024, by which detection signals generated by sensing elements of section 1002 may be processed by analog signal path 1004 and ADC 1024, and be output to digital multiplexer 408. Digital multiplexer 408 may receive outputs of different ADCs associated with different sections of detector array 1000.

Detector array 1000 includes interconnection layer 1006 that communicatively couples outputs of signal processing circuitry to each other. The signal processing circuitry may include the analog signal paths (including analog signal path 1004). As shown in FIG. 10, interconnection layer 1006 includes interconnection switching elements communicatively coupled to outputs of analog signal paths of detector array 1000. For example, interconnection switching elements 1014, 1016, 1018, and 1020 may communicatively couple the outputs of adjacent analog signal paths (including analog signal path 1004).

In FIG. 10, a switching element 1008 may communicatively couple an output of section 1002 to an input of analog signal path 1004. A switching element 1010 may communicatively couple an output of analog signal path 1004 to an input (e.g., input/output point 1026 or "I/O point" 1026) of interconnection layer 1006. Switching elements 1008 and 1010 may be configured to be communicatively disconnected if analog signal path 1004 is not selected for use. For example, a charged-particle beam may impinge on some or all of the sensing elements of section 1002, but the detection signals of section 1002 may be redirected to another analog signal path corresponding to another section of detector array 1000. In such a case, analog signal path 1004 may be disconnected as a result of not being selected. In some embodiments, if no sensing element of section 1002 is impinged by any charged-particle and analog signal path 1004 is not selected for use (e.g., to process signals from other sections), besides communicatively disconnecting switching elements 1008 and 1010, amplifier 1022 may also be disabled to reduce power consumption. When switching elements 1008 and 1010 are communicatively disconnected, analog signal path 1004 (including amplifier 1022) may be effectively deactivated from detector array 1000.

In FIG. 10, a switching element 1012 may communicatively couple an output (e.g., I/O point 1026) of interconnection layer 1006 to an input of ADC 1024. In some embodiments, the output of interconnection layer 1006 may also be an input. For example, I/O point 1026 may function as both an input (communicatively coupled to the output of analog signal path 1004) and an output (communicatively coupled to the input of ADC 1024) of interconnection layer 1006. In some embodiments, the output of analog signal path 1004 may be equivalent to I/O point 1026. In some embodiments, the input of ADC 1024 may be equivalent to I/O point 1026. In some embodiments, I/O point 1026 may be implemented as separate components (not shown in FIG. 10). When switching element 1012 is communicatively disconnected, ADC 1024 may be effectively deactivated from section 1002 and any other section (not shown in FIG. 10) that is communicatively coupled to ADC 1024 via interconnection switching elements 1014, 1016, 1018, or 1020. In some embodiments, switching element 1012 may be configured to be communicatively disconnected if ADC 1024 is not selected for use. For example, signals output from analog signal path 1004 may be redirected to another ADC corresponding to another analog signal path in detector array 1000. In some embodiments, if no sensing element of section 1002 is impinged by any charged-particle and neither analog signal path 1004 nor ADC 1024 is selected for use (e.g., to process signals from other sections), besides communicatively disconnecting switching element 1012, ADC 1024 may also be disabled to reduce power consumption.

In some embodiments, detector array 1000 may route charged-particle detection signals in various ways depending on various factors, such as a size of a beam spot, a shape of the beam spot, or a pixel rate aimed to be achieved, or the like. Detector array 1000 may route the detection signals by controlling connecting and disconnecting switching elements between sensing elements, switching elements 1008, 1010, 1012, and interconnection switching elements 1014, 1016, 1018, 1020. For example, detector array 1000 may route (e.g., through switching elements between sensing elements) signals output by section 1002 to another analog signal path other than analog signal path 1004. In another example, detector array 1000 may route signals from another section other than section 1002 to analog signal path 1004 through switching element 1008. In another example, detector array 1000 may route (e.g., through interconnection switching elements 1014, 1016, 1018, or 1020) signals output by analog signal path 1004 to another ADC other than ADC 1024. In another example, detector array 1000 may route (e.g., via switching element 1012) signals from another analog signal path other than analog signal path 1004 to ADC 1024. In some embodiments, if section 1002 generates no detection signals and neither analog signal path 1004 nor ADC 1024 is selected for use, and if an analog signal path or an ADC of an adjacent section is selected for use, an interconnection switching element (e.g., interconnection switching element 1014, 1016, 1018, or 1020) between section 1002 and the adjacent section may be communicatively disconnected, which may help to reduce crosstalk and parasitic parameters incurred by amplifier 1022 and ADC 1024 if they are powered on.

In some embodiments, if a sensing element (e.g., sensing element 311) of section 1002 is not in use and is not included in any sensing element group for detection of any secondary electron beam, it may be communicatively decoupled from wiring paths 402 for reducing parasitic parameters (e.g., stray capacitance), which may further help to improve performance of detector array 1000. For example, sensing element 311 may be disconnected from wiring paths 402 by communicatively disconnecting a switching element between sensing element 311 and wiring paths 402. While sensing element 311 is disconnected from wiring paths 402, all the switching elements between sensing element 311 and its neighboring sensing elements may also be communicatively disconnected.

In some embodiments, interconnection layer 1006, interconnection switching elements 1014, 1016, 1018, and 1020, and switching elements 1008, 1010, and 1012 may be included in a readout layer (e.g., similar to readout layer 303 in FIG. 3A) of detector array 1000. In some embodiments, interconnection switching elements 1014, 1016, 1018, 1020 and switching elements 1008, 1010, 1012 may be implemented using techniques similar to switching elements 519 and 521 as described in FIG. 6.

In some embodiments, components such as the amplifiers (e.g., amplifier 1022) in the analog signal paths of detector array 1000, or the ADCs (e.g., ADC 1024) at the end of the signal path of detector array 1000 may be configured to work in a current mode, in which the inputs and outputs of the amplifiers and ADCs are electric currents. In some embodiments, the components (e.g., amplifier 1022 or ADC 1024) may be configured to work in a charge mode, in which the inputs and outputs of the amplifiers and ADCs are charge signals. Both amplifier 1022 and ADC 1024 may operate in current or charge mode, or in a hybrid mode. The hybrid mode may be a mixed mode of current mode and charge mode. In hybrid mode, the inputs and outputs of the amplifiers and ADCs may be configured to work in either of current mode or charge mode.

Compared with amplifiers working in voltage mode, amplifiers working under the charge mode or current mode may have decreased input impedance and increased output impedance. The decreased input impedance may lower the sensitivity of the amplifiers to surrounding interference (e.g., interference from adjacent digital components) and lower the sensitivity of the amplifiers to parasitic parameters (e.g., stray capacitance). Such benefits may also be achieved in other components besides amplifiers, such as ADCs. With the decreased input impedance, a component may have a high analog signal bandwidth even if some stray capacitance is present at its input and may enable hardware-based analog signal processing, in which the hardware involves interconnections between different signal paths (e.g., interconnection layer 1006). The increased output impedance may facilitate adding output signals from different analog signal paths. For example, the output signals from different analog signal paths may be added by communicatively connecting the outputs of the analog signal paths at a common point. The current or charge mode design for amplifiers and ADCs may lower the difficulty of designing and implementing hardware-based analog signal processing.

Figure 11:
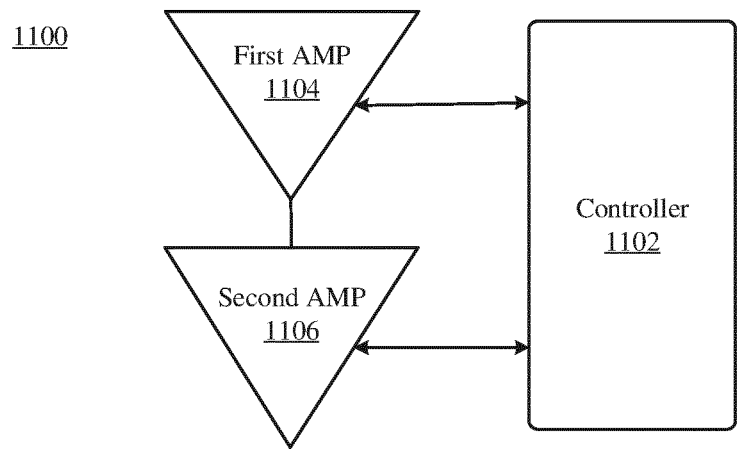
FIG. 11 is a diagram illustrating an exemplary amplifier working in a current mode, consistent with embodiments of the present disclosure.

FIG. 11 is a diagram illustrating an exemplary amplifier 1100 working in a current mode, consistent with embodiments of the present disclosure. In some embodiments, amplifier 1100 may be amplifier 1022 in detector array 1000. Amplifier 1100 includes a controller 1102, a first amplifier 1104, and a second amplifier 1106. First amplifier 1104 and second amplifier 1106 may be communicatively coupled in series, in which an output of first amplifier 1104 may be communicatively coupled to an input of second amplifier 1106. An input of first amplifier 1104 may receive a current signal generated by sensing elements (e.g., sensing elements in section 1002 in FIG. 10). An output of second amplifier 1106 may transmit an amplified current signal to an ADC (e.g., ADC 1024 in FIG. 10). Controller 1102 may be communicatively coupled to and control the operation of first amplifier 1104 and second amplifier 1106. In some embodiments, first amplifier 1104 may be a charge-transfer amplifier (CTA), a transimpedance amplifier (TIA), or a combination of CTA and TIA (CTIA) that can operate in either TIA or CTA mode. In some embodiments, second amplifier 1106 may be a transconductance amplifier (TCA). It should be noted that although amplifier 1100 is shown to include two amplification stages (i.e., first amplifier 1104 and second amplifier 1106) in FIG. 11, it may be implemented to have only one amplification stage or multiple amplification stages. For example, if amplifier 1100 is a single-stage amplifier, it may include a current amplifier, the input and output of which may be both electric currents. In another example, if amplifier 1100 is a multi-stage amplifier, it may include more amplifiers besides first amplifier 1104 and second amplifier 1106. This disclosure does not limit the embodiments of amplifier 1100 to the above-described examples. In some embodiments, the amplifiers may include a dual-mode charge-transfer and transimpedance amplifier. The amplifiers may also include a transconductance amplifier. Amplifiers may be configured to receive a current signal and output an electric-charge signal, or vice versa.

Figure 12:
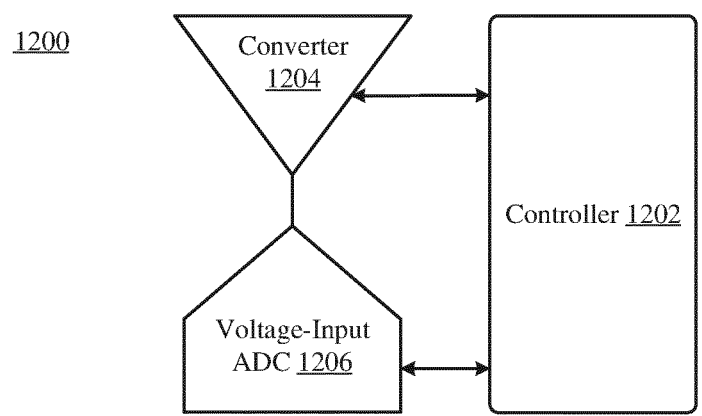
FIG. 12 is a diagram illustrating an exemplary analog-to-digital converter working in a current mode, consistent with embodiments of the present disclosure.

FIG. 12 is a diagram illustrating an exemplary ADC 1200 working in a current or charge mode, consistent with embodiments of the present disclosure. ADC 1200 may be ADC 1024 in detector array 1000 of FIG. 10. In the current or charge mode, the input of ADC 1200 may be current or charge signals, and the output of ADC 1200 may be either current or voltage signals. ADC 1200 includes a controller 1202, a converter 1204, and a voltage-input ADC 1206. Converter 1204 may be a current-to-voltage (I-V) converter or a charge-to-voltage (C-V) converter, etc. Converter 1204 may be configured to transform a signal, such as current or charge, to digital information, such as a voltage. Converter 1204 and voltage-input ADC 1206 may be communicatively coupled in series, in which an output of converter 1204 may be communicatively coupled to an input of voltage-input ADC 1206. An input of converter 1204 may receive a current signal output by amplifier 1100. An output of voltage-input ADC 1206 may transmit a digital signal to other processing circuitry (e.g., digital multiplexer 408 in FIG. 10). Controller 1202 may be communicatively coupled to and control the operation of converter 1204 and voltage-input ADC 1206. It should be noted although ADC 1200 is shown to include two stages (i.e., converter 1204 and voltage-input ADC 1206) in FIG. 12, it may be implemented to have only one stage and is still capable of operating in the current or charge mode. For example, if ADC 1200 is a single-stage ADC, it may be a charge-redistribution ADC or a charge-sharing ADC. This disclosure does not limit the embodiments of ADC 1200 to the above-described examples.

Figure 13:
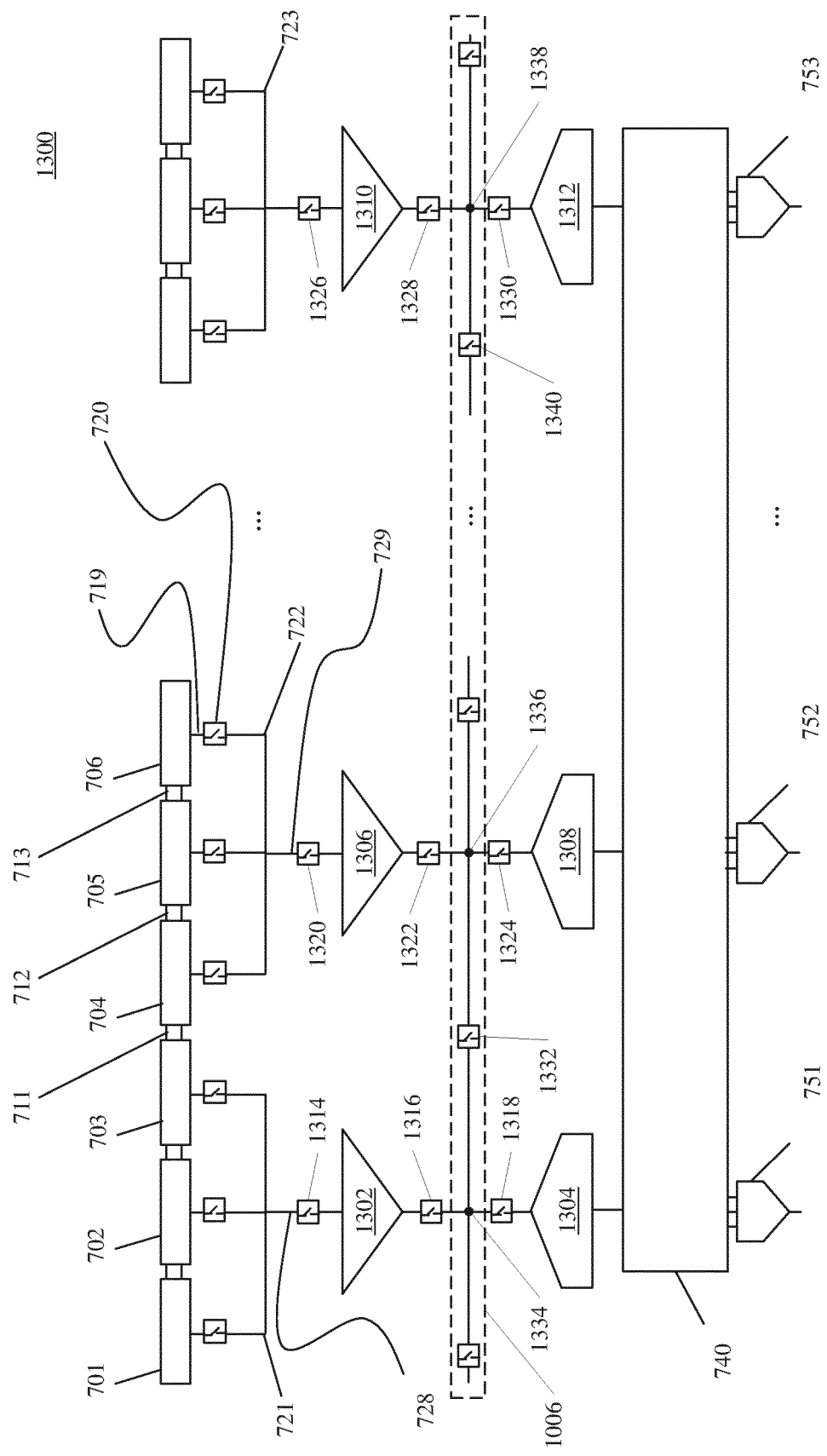
FIG. 13 is a diagram representing an exemplary section arrangement of a detector having the exemplary architecture of FIG. 10, consistent with embodiments of the present disclosure.

FIG. 13 is a diagram representing an exemplary section arrangement of a detector 1300 having the exemplary architecture of FIG. 10, consistent with embodiments of the present disclosure. Detector 1300 may have components similar to detector 700 of FIG. 7, including sensing elements 701, 702, 703, 704, 705, and 706, inter-element switching elements 711, 712, and 713, output 719, element-bus switching element 720, wiring paths 721, 722, and 723, common outputs 728 and 729, digital switch 740, and data channels 751, 752, and 753. In some embodiments, digital switch 740 may include digital multiplexer 408 as shown in FIG. 10.

In FIG. 13, similar to detector array 1000, amplifiers (including amplifiers 1302, 1306, and 1310) of detector 1300 may be communicatively coupled to sections via switching elements (e.g., switching elements 1314, 1320, and 1326). In some embodiments, the amplifiers may be similar to amplifier 1022 in FIG. 10 or amplifier 1100 in FIG. 11. The switching elements may be similar to switching element 1008 in FIG. 10.

In FIG. 13, detector 1300 includes ADCs (including ADCs 1304, 1308, and 1312) and interconnection layer 1006 (represented by the dashed line box) that is arranged between the amplifiers and the ADCs. The ADCs may be similar to ADC 1024 in FIG. 10 or ADC 1200 in FIG. 12. The amplifiers may be communicatively coupled to interconnection layer 1006 via switching elements (including switching elements 1316, 1322, and 1328), which may be similar to switching element 1010 in FIG. 10. Interconnection layer 1006 may be communicatively coupled to the ADCs via switching elements (including switching elements 1318, 1324, and 1330), which may be similar to switching element 1012 in FIG. 10. In some embodiments, switching elements 1314-1332 and 1340 may be implemented using techniques similar to switching elements 519 and 521 as described in FIG. 6.

In FIG. 13, interconnection layer 1006 may include multiple outputs, including an I/O point 1334, an I/O point 1336, and an I/O point 1338. In some embodiments, I/O points 1334, 1336, and 1338 may be similar to I/O point 1026 in FIG. 10. In some embodiments, each of the amplifiers (e.g., including amplifiers 1302, 1306, and 1310) of detector 1300 may be communicatively coupled to an input (e.g., I/O points 1334, 1336, and 1338, respectively) of interconnection layer 1006 via a switching element (e.g., switching element 1316, 1322, and 1328, respectively). In some embodiments, each of the ADCs (e.g., including ADCs 1304, 1308, and 1312) of detector 1300 may be communicatively coupled to an output (e.g., I/O points 1334, 1336, and 1338, respectively) of interconnection layer 1006 via a switching element (e.g., switching element 1318, 1324, and 1330, respectively).

In FIG. 13, interconnection layer 1006 includes interconnection switching elements (e.g., interconnection switching element 1332) communicatively coupled to outputs of the amplifiers, which may be similar to interconnection switching elements 1014, 1016, 1018, and 1020 in FIG. 10. In some embodiments, the interconnection switching elements in interconnection layer 1006 may be implemented using techniques similar to switching elements 519 and 521 as described in FIG. 6.

In some embodiments, for increasing the pixel rate, the ADCs of detector 1300 may be configured to work in an interleaving mode. Generally, when ADCs work in the interleaving mode, two or more ADCs may be communicatively coupled to a clocking circuit. The clocks of the ADCs may be set to have a predetermined relationship. When operating, the ADCs may alternately sample ("interleave") an input signal and generate a combined output signal. The pixel rate of the combined output signal may be higher than a pixel rate achieved by each individual ADC. For example, when m (m being an integer) ADCs are configured to work in the interleaving mode, in which each ADC has a pixel rate of n (n being a number) pixels per second, the combined pixel rate of the m ADCs may be m×n pixels per second.

For example, a clocking circuit (not shown in FIG. 13) and a control circuit (not shown in FIG. 13) may be provided in digital switch 740. A clock control circuit (e.g., may be part of controller 1202 in FIG. 12) may be provided in each ADC, including ADCs 1304, 1308, and 1312. The clock control circuit may be communicatively coupled to the clocking circuit and set different timing shifts for each ADC with reference to a clock signal generated by the clocking circuit. The inputs of the ADCs may be communicatively coupled to each other via the switching elements in interconnection layer 1006, and the control circuit may control them to work in the interleaving mode. In some embodiments, the amplifiers of detector 1300 working in the current mode may provide more flexibility to the ADCs to be configured to work the interleaving mode.

In some embodiments, for an application that requires a pixel rate higher than a pixel rate supported by the maximum sampling rate of the ADCs of detector 1300, the ADCs may be configured to work in the interleaving mode. For example, ADCs 1304 and 1308 may have the same maximum sampling rate. When wiring paths 721 are activated (e.g., due to a charged-particle beam impinging on sensing elements 701-703), switching elements 1314 and 1316 may be communicatively connected to enable the signal output by wiring paths 721 to be processed and amplified by amplifier 1302. Interconnection switching element 1332 and switching elements 1318 and 1324 may be coordinated to divert the amplified signal output by amplifier 1302 to ADCs 1304 and 1308 in an alternate manner. For example, the amplified signal output by amplifier 1302 may be diverted to ADC 1304 by communicatively connecting switching element 1318, and communicatively disconnecting interconnection switching element 1332 and switching element 1324. The amplified signal output by amplifier 1302 may be diverted to ADC 1308 by communicatively disconnecting switching element 1318, and communicatively connecting interconnection switching element 1332 and switching element 1324. The control circuit and clocking circuit may control the timing of such diversions and the timing of sampling for ADCs 1304 and 1308. The combined output signal of ADCs 1304 and 1308 may have an effective sampling rate twice that of the maximum sampling rate of any single ADC.

In should be noted that more than two ADCs of detector 1300 may be configured to work in the interleaving mode in a similar manner, and this disclosure does not limit the embodiments of the interleaving mode to the above examples. In some embodiments, the communicatively coupled ADCs of detector 1300 working in the interleaving mode may be either adjacent to each other or not adjacent to each other. For example, ADCs 1304, 1308, and 1312 may be configured to work in the interleaving mode, in which the interconnection switching elements of interconnection layer 1006 between them (e.g., including interconnection switching element 1332) and switching elements 1318, 1324, and 1330 may be coordinated to divert the amplified signal output by amplifier 1306 to ADCs 1304, 1308, and 1312 in an alternate manner. For example, the amplified signal output by amplifier 1306 may be diverted to ADC 1304 by communicatively connecting switching element 1318 and interconnection switching element 1332, and communicatively disconnecting switching element 1324, switching element 1330, and one or more interconnection switching elements between ADCs 1308 and 1312. The amplified signal output by amplifier 1306 may be diverted to ADC 1308 by communicatively connecting switching element 1324, and communicatively disconnecting switching element 1318, switching element 1330, interconnection switching element 1332, and one or more interconnection switching elements between ADCs 1308 and 1312. The amplified signal output by amplifier 1306 may be diverted to ADC 1312 by communicatively connecting switching element 1330 and all interconnection switching elements between ADCs 1308 and 1312, and communicatively disconnecting switching element 1318, switching element 1324, and interconnection switching element 1332.

In some embodiments, when the beams impinging on detector 1300 have a large beam spot, multiple analog signal paths of detector 1300 may be configured to be communicatively coupled to a single ADC via interconnection layer 1006. For example, the analog signals from different analog signal paths may be summed or merged by hardware (e.g., at interconnection layer 1006) before being input to any ADC. The summed analog signal may be converted by a single ADC. Such a design may reduce the needed digital output bandwidth and increase configuration flexibility. In contrast, existing designs of detectors may lack the capability of hardware-based analog signal summing before signal digitizing (e.g., due to analog signal path having no capability of outputting its signals to ADCs in other signal paths), and may require multiple digital output channels or bandwidth to process signals from the same large beam spot. Compared with existing designs, the design of detector 1300 may provide a higher analog signal bandwidth without requiring additional digital output capacity or causing significant increase in sizes of readout circuits, because a single ADC may be sufficient to process an analog signal summed before its input with analog signals from multiple analog signal paths.

Figure 14:
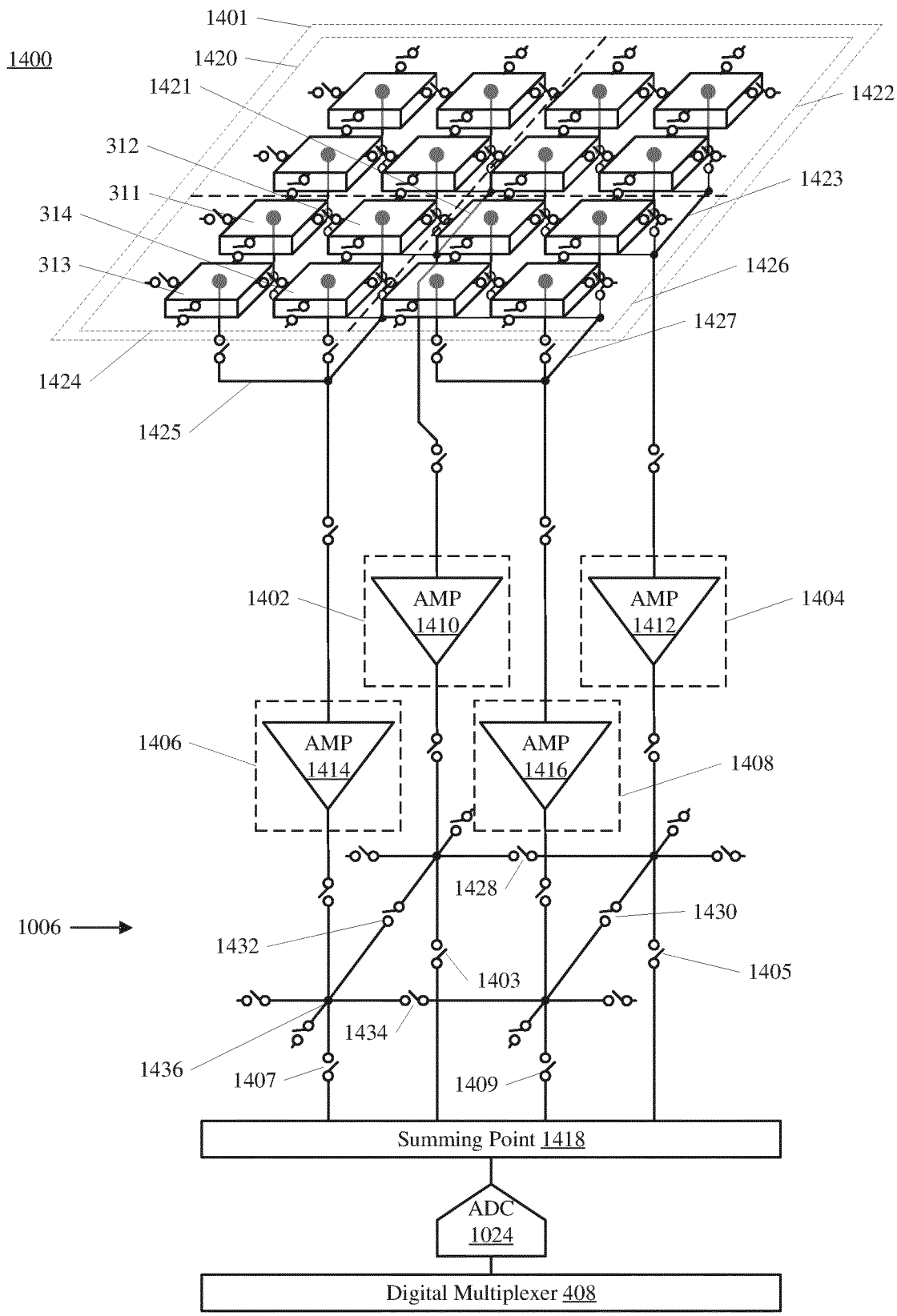
FIG. 14 is a diagram illustrating a detector array with another exemplary architecture, consistent with embodiments of the present disclosure.

FIG. 14 is a diagram illustrating a section 1401 of a detector array 1400 with an exemplary architecture, consistent with embodiments of the present disclosure. The architecture of FIG. 14 may be used in either a single-beam inspection tool or a multibeam inspection tool (e.g., beam tool 104 in FIG. 2). Section 1401 shares some similar components with section 1002 in FIG. 10, including sensing elements 311, 312, 313, and 314, ADC 1024, and digital multiplexer 408. In FIG. 14, section 1401 includes four subsections 1420, 1422, 1424, and 1426, each of which includes 2×2 sensing elements. Subsection 1424 includes sensing elements 311, 312, 313, and 314. Subsections 1420, 1422, 1424, and 1426 are communicatively coupled to wiring paths 1421, 1423, 1425, and 1427, respectively. FIG. 14 also shows four analog signal paths 1402, 1404, 1406, and 1408 communicatively coupled to wiring paths 1421, 1423, 1425, and 1427, respectively. Analog signal paths 1402, 1404, 1406, and 1408 may each be similar to analog signal path 1004 in FIG. 10 and include amplifiers 1410, 1412, 1414, and 1416, respectively. Each of analog signal paths 1402, 1404, 1406, and 1408 has an upstream switching element (e.g., similar to switching element 1008 in FIG. 10) between it and its wiring paths, and also has a downstream switching element (e.g., similar to switching element 1010 in FIG. 10) between it and interconnection layer 1006. As shown in FIG. 14, analog signal paths 1402, 1404, 1406, and 1408 are communicatively coupled to a summing point 1418 via interconnection layer 1006 with switching elements 1403, 1405, 1407, and 1409 (e.g., each being similar to switching element 1012 in FIG. 10) arranged between summing point 1418 and interconnection layer 1006. Summing point 1418 may be communicatively coupled to ADC 1024, which is further communicatively coupled to digital multiplexer 408. Summing point 1418 may operate as an analog multiplexer and may output a multiplexed analog signal to ADC 1024 to convert it to a digital signal. The digital signal may be output to digital multiplexer 408 for further processing.

In FIG. 14, subsections 1420, 1422, 1424, and 1426 are associated with analog signal paths 1402, 1404, 1406, and 1408, respectively. Analog signal paths 1402, 1404, 1406, and 1408 are associated with ADC 1024. In some embodiments, the numbers of the analog signal paths associated with one ADC may be arbitrary in section 1401. In some embodiments, different numbers of analog signal paths may be associated with one ADC in section 1401. Compared with analog signal path 1004 of detector array 1000 in FIG. 10, each of analog signal paths 1402, 1404, 1406, and 1408 in FIG. 14 may process signals detected from fewer sensing elements, which may increase the analog signal bandwidth and configuration flexibility. Section 1401 may route signals output by analog signal paths 1402, 1404, 1406, and 1408 to summing point 1418 in various ways by controlling opening and closing of interconnection switching elements 1428, 1430, 1432, and 1434 and switching elements 1403, 1405, 1407, and 1409.

In some embodiments, if signals output by analog signal paths 1402, 1404, 1406, and 1408 are from the same beam spot, those signals may be added (e.g., by hardware-based analog signal summing) at interconnection layer 1006 before being output to summing point 1418. For example, in such cases, interconnection switching elements 1428, 1430, and 1432 may be communicatively connected, switching elements 1403, 1405, and 1407 may be communicatively disconnected, and switching element 1409 may be communicatively connected, by which the signals output by analog signal paths 1402, 1404, 1406, and 1408 may be added at interconnection layer 1006 and output to summing point 1418 via switching element 1409.

In some embodiments, if signals output by analog signal paths 1402, 1404, 1406, and 1408 are all from different beam spots, those signals may be multiplexed to summing point 1418 without hardware-based analog signal summing. For example, in such cases, switching elements 1403, 1405, 1407, and 1409 may all be communicatively connected. If the highest sampling rate of ADC 1024 is sufficient to support the required pixel rate, interconnection switching elements 1428, 1430, 1432, and 1434 may all be communicatively disconnected, and the signals output by analog signal paths 1402, 1404, 1406, and 1408 may be multiplexed to summing point 1418 that may further output the multiplexed signal to ADC 1024 for signal digitization. If the highest sampling rate of ADC 1024 is insufficient to support the required pixel rate, the signals output by analog signal paths 1402, 1404, 1406, and 1408 may be output to multiple summing points (e.g., including summing point 1418 or others) via one or more interconnection switching elements in interconnection layer 1006, and the multiple summing points may output the signals to multiple ADCs (e.g., including ADC 1024 or others) for signal digitization. In such cases, the multiple ADCs may work in the interleaving mode.

In some embodiments, some of the signals output by analog signal paths 1402, 1404, 1406, and 1408 may be from the same beam spot, and some of the signals may be from different beam spots. In those cases, the signals from the same beam spot may be added at interconnection layer 1006 to generate a sum of analog signals, and the signals from different beam spots may be kept as individual signals (e.g., without performing hardware-based analog signal summing)

at interconnection layer 1006. The sum analog signal and the individual signals may be multiplexed to summing point 1418 or multiple summing points as described above, depending on whether the highest sampling rate of ADC 1024 is sufficient to support the required pixel rate.

In some embodiments, the configuration flexibility and performance adaptability of the architecture as shown in FIG. 14 may be further increased by communicatively coupling multiple analog signal paths (e.g., including analog signal paths 1402, 1404, 1406, and 1408) to multiple summing points (e.g., including summing point 1418) via the switching elements of interconnection layer 1006. By doing so, section 1401 may be configured to have various ratios of analog signal paths to ADCs in a data channel for different applications. Depending on the applications and detector settings, the number of analog signal paths (e.g., the number of amplifiers) may be larger than, smaller than, or equal to the number of ADCs in the data channel. By doing so, the architecture as shown in FIG. 11, FIG. 13, and FIG. 14 may provide high configuration flexibility, high failure tolerance, and low power consumption for signal processing without incurring significant costs.

The high configuration flexibility may avoid the one-directional optimization problem. For example, several ADCs may be interleaved to process signals from multiple analog signal paths, such as for applications involving large-spot beams and requiring high pixel rates. In another example, one ADC may be assigned to one beam (e.g., requiring one analog signal path) for signal processing. In another example, one ADC may be shared by several beams (e.g., passing several analog signal paths) for signal processing, such as for applications involving high-density beams and not requiring high pixel rates. The high failure tolerance may increase robustness of the detection system. For example, if some of the amplifiers or ADCs of the detector malfunction, the malfunctioning components may be bypassed, and the signals supposed to be processed by them may be redirected to other components for processing. The low power consumption may be achieved by powering of (and communicatively disconnecting) unnecessary components (e.g., analog signal paths or ADCs) of the detector without affecting the performance as required by specific applications. It should be noted that the specific ratios of the amplifiers to ADCs and the specific manners of signal routing and processing may not be limited to the above-described examples, and embodiments of this disclosure may provide other implementations depending on specific applications.

Figure 15:
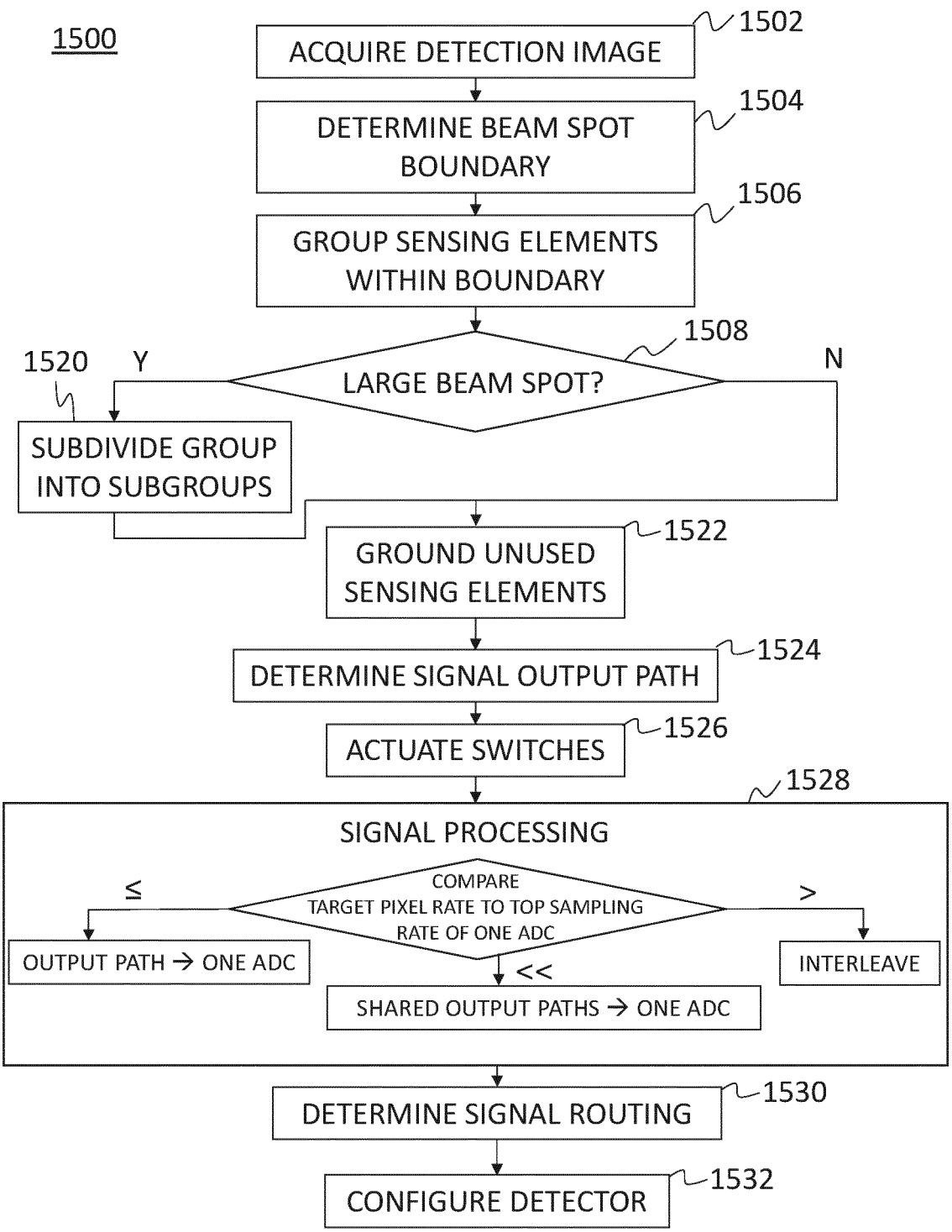
FIG. 15 is a flowchart of an exemplary method of detecting a charged-particle beam, consistent with embodiments of the present disclosure.

FIG. 15 is a flowchart of an exemplary method 1500 of detecting a charged-particle beam, consistent with embodiments of the present disclosure. Method 1500 may be performed by a controller of the charged-particle inspection system (e.g., controller 109 in FIG. 1 or controller 904 in FIG. 9). The controller may include circuitry (e.g., a memory and a processor) programmed to implement method 1500. For example, the controller may be an internal controller or an external controller (e.g., controller 109 in FIG. 1 or controller 904 in FIG. 9) coupled with the charged-particle inspection system. Method 1500 may be connected to the components, operations, and steps shown and described with relation to FIGS. 3A-14.

As shown in FIG. 15, method 1500 may begin with a step 1502 of acquiring a detection image. The detection image may be an image of a charged particle beam spot formed on a surface of a detector (e.g., a secondary electron beam spot). The detection image may include a secondary beam spot projection pattern on the detector surface. When multiple charged particle beams are incident on the detector, the detection image may include multiple beam spots. Step 1502 may include reading individual outputs of sensing elements that may be included in the detector. It may be determined in step 1502 that charged particles exiting a wafer are incident on the detector and thus image processing should begin. Step 1502 may include image acquisition processing that is performed at a relatively low speed as compared to a target pixel rate of a particular application.

Next, as shown in FIG. 15, method 1500 may proceed to a step 1504 of determining a boundary. The boundary may correspond to a boundary of a charged particle beam spot projected on the surface of the detector. The boundary may be determined from information gathered at step 1502. Step 1504 may include determining multiple boundaries that correspond to multiple beam spots. Boundaries may be used for assigning sensing elements to groups, as will be discussed below.

Next, as shown in FIG. 15, method 1500 may proceed to a step 1506 of grouping sensing elements together. Sensing elements within a boundary may be grouped together. Step 1506 may include actuating switches. Switches between sensing elements may be actuated such that, for example, two adjacent sensing elements that are within the same group are electrically connected.

Next, as shown in FIG. 15, method 1500 may proceed to a step 1508 of determining whether a beam spot is large. Step 1508 may be based on predetermined criteria. Step 1508 may include determining a size of a beam spot and comparing it to a threshold. Step 1508 may include determining whether a target analog bandwidth corresponding to a target pixel rate is achievable for a group of sensing elements. Determining whether the target analog bandwidth is achievable may be based on characteristics of the sensing elements and signal processing circuitry included in the group. A beam spot may be determined to be large when, for example, the beam spot has such a size that the target bandwidth for the application will not be achievable based on the number of sensing elements included in the group.

In response to determining that a beam spot is not large in step 1508, method 1500 may proceed to a step 1522 of grounding unused sensing elements, as will be discussed below. When the beam spot is determined not to be large, the beam spot may be treated as a single group and processed as such.

In response to determining that a beam spot is large in step 1508, method 1500 may proceed to a step 1520 of subdividing the group corresponding to the large beam spot into subgroups. Step 1520 may include determining a size of subgroups. The size of subgroups may be based on the target analog bandwidth. Subgroups may be treated as an individual group of sensing elements and may be associated with an analog signal path, as will be discussed below.

Figure 16:
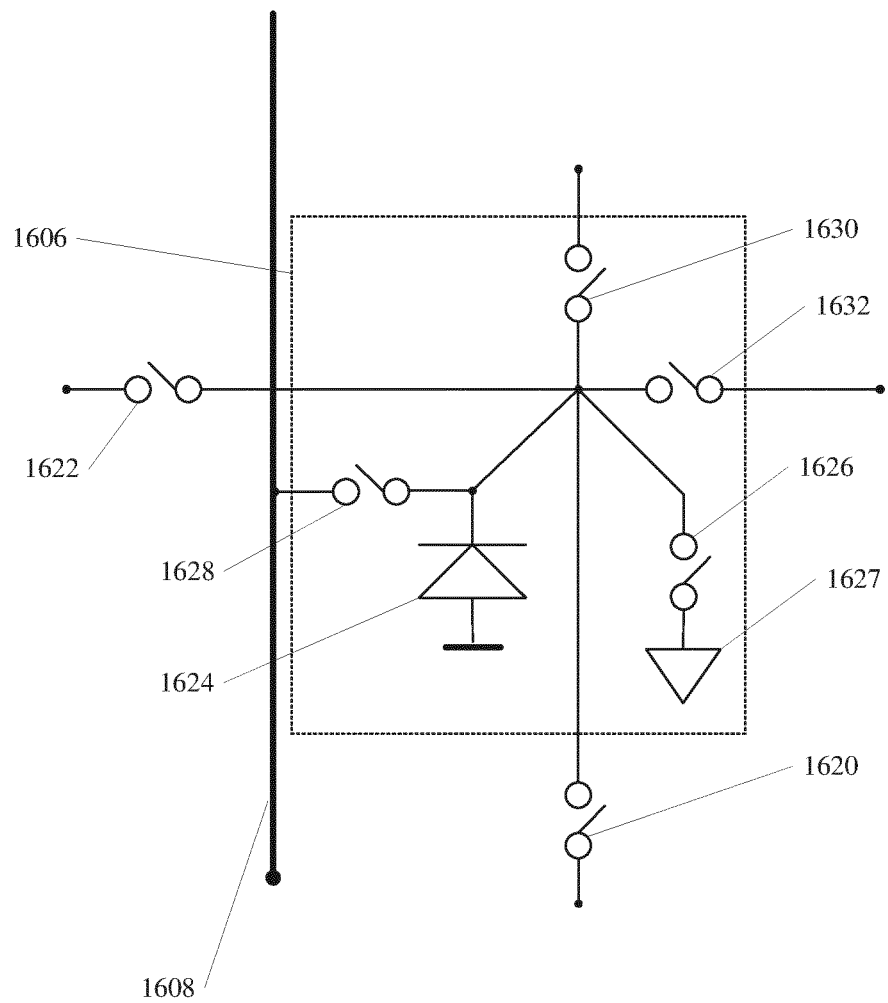
FIG. 16 is a diagrammatic representation of a sensing element, consistent with embodiments of the present disclosure.

Next, as shown in FIG. 15, method 1500 may proceed from either step 1508 or step 1520 to a step 1522 of grounding unused sensing elements. Sensing elements that are not in use may be grounded using a grounding switch, or other means. The grounding switch may be provided in the sensing element level of circuitry. An example of a grounding switch is shown in FIG. 16. Sensing elements may be determined to be unused based on whether or not they are included in the group or subgroup, for example. In some embodiments, unused sensing elements may be determined to be those not outputting a detection signal, or those determined to be excluded from the group or subgroup for certain reasons (e.g., to reduce cross talk).

Next, as shown in FIG. 15, method 1500 may proceed to a step 1524 of determining signal output path. Step 1524 may include determining a signal output path for each beam spot and its corresponding sensing element group or subgroups. The signal output path may be an analog signal path. In some embodiments, location of the output point for each group or subgroup may be determined to be in a region of the geometric center or mass center of each sensing element group or subgroup. Determining an output location based on mass center may involve using the intensity distribution of the beam spot within the group or subgroup.

Next, as shown in FIG. 15, method 1500 may proceed to a step 1526 of actuating switches to connect a group or subgroup of sensing elements to its signal output path. The signal output path assigned to a group or subgroup of sensing elements may be that determined in step 1524. Switches actuated in step 1526 may be switches provided at the outputs of sensing elements (e.g., as opposed to switches between adjacent sensing elements). Step 1526 may include connecting sensing elements to an analog signal path that has the shortest distance from the geometric or mass center of the group or subgroup. The input of the analog signal path may be connected to the group or subgroup of sensing elements through the output of the sensing at the geometric or mass center of the group or subgroup, or through the outputs of sensing elements near the geometric or mass center. Switches at the outputs of sensing elements may be closed and those sensing elements may be connected to a common wire in a section that the analog signal path belongs to. In some embodiments, the number of switches at the outputs of sensing elements may be 1 or more than 1. When the number of switches is more than 1, impedance from the group or subgroup of sensing elements to the input of the analog signal path may be reduced. This may result in improved analog signal bandwidth.

Next, as shown in FIG. 15, method 1500 may proceed to a step 1528 of signal processing. Step 1528 may include digitizing the signal of a beam spot by an ADC. The signal that is digitized by the ADC may be an amplified signal that has been amplified through the analog signal path of a group of sensing elements. When the beam spot is large (Y in step 1508), step 1528 may include adding together signals from subgroups of sensing elements. These signals may be added together by hardware, for example, in such a way that corresponding switches between outputs of analog signal paths are connected (e.g., in interconnection layer 1006 as shown in FIG. 10, FIG. 13, and FIG. 14). Step 1528 may include determining whether the target pixel rate is greater than the top sampling rate of one ADC. If the target pixel rate is not greater than the top sampling rate of one ADC, then one ADC may be assigned to each output signal path of a beam spot. If the target pixel rate is much less than the top sampling rate of one ADC, one ADC may be shared through an interconnection layer (e.g., interconnection layer 1006 as shown in FIG. 10, FIG. 13, and FIG. 14) by multiple analog signals. The target pixel rate may be much less than (<<) the top sampling rate of one ADC when, for example, they are at least an order of magnitude apart (e.g., the top sampling rate is 10 times or more greater than the target pixel rate). If the target pixel rate is higher than the top sampling rate of one ADC, then multiple ADCs may be interleaved through the interconnection layer and the multiple ADCs may be used to process the analog signals of one beam spot.

Next, as shown in FIG. 15, method 1500 may proceed to a step 1530 of determining signal routing. Signal routing for ADC outputs may be determined based on the location of the ADCs in the detector and the digital output channels used to transfer data from them.

Next, as shown in FIG. 15, method 1500 may proceed to a step 1532 of configuring the detector. The detector may be configured based on various other determinations performed in method 1500. For example, the detector may be configured to operate in normal beam intensity detection mode running at a pixel rate required by a particular application. The setting may be maintained until SEM imaging conditions are changed that may causes changes in secondary electron beam projection.

Modifications and variations of method 1500 will be apparent. For example, in FIG. 15, at step 1502, a controller may determine a sensing-element group, in which the sensing-element group may include a sensing element that is being projected by a beam spot of a charged-particle beam in a charged-particle detector (e.g., detector 1300 in FIG. 13 or detector array 1400 in FIG. 14). For example, the charged-particle beam may be any of secondary charged-particle beams 236, 238, and 240 in FIG. 2. The sensing element may be on a surface (e.g., sensor surface 300B in FIG. 3B) of the charged-particle detector, such as any of sensing elements 311-314 in FIG. 10, any of sensing elements 701-706 in FIG. 13, or any of sensing elements 311-314 in FIG. 14. The sensing-element group may correspond to a profile or a shape of the beam spot. For example, the boundary sensing elements in the sensing-element group may represent a boundary of the beam spot.

In some embodiments, the charged-particle detector may be a scanning electron microscope (SEM). In some embodiments, the charged-particle detector may be in a single-beam inspection apparatus (e.g., a single-beam SEM). In some embodiments, the charged-particle detector may be in a multi-beam inspection apparatus (e.g., beam tool 104 in FIG. 2). It should be noted that methods may be implemented with a single-beam inspection apparatus or multi-beam inspection apparatus, and this disclosure does not impose any limit on such implementations.

In some embodiments, the sensing-element group may include a plurality of sensing elements. In those cases, the controller may receive output signals of the plurality of sensing elements of the charged-particle detector. The controller may collect information to, for example, detect or form a picture of a secondary charged-particle beam spot projected on the detector. The controller may read the output of each individual sensing element. Any switches between adjacent sensing elements (e.g., inter-element switching elements 711, 712, and 713 as shown in FIG. 13) may be in an open (e.g., disconnected) state. For example, if the charged-particle detector is detector 1300 in FIG. 13, the controller may receive an output signal of sensing element 706 through output 719. The controller may use collected information to determine a boundary of incident charged particle beam spots on the detector surface.

Determination of whether a beam spot is large, as in step 1508 of FIG. 15 may be based on a condition. The condition may be related to capabilities of signal processing circuitry in a detector. For example, a controller may determine that signal processing circuitry associated with a sensing-element group can or cannot handle a particular case (e.g., based on a target application). This may be related to a target analog signal bandwidth for an application. Bandwidth may be determined by characteristics of a sensing-element group, including its associated components. For example, the bandwidth for a sensing-element group may be determined by the size of the sensing-element group and the amplifier associated with it. A total analog signal bandwidth for processing an output signal of the sensing-element group under a predetermined pixel rate may or may not meet the requirements of an application.

For example, when the beam spot of a charged particle beam detected at step 1502 is large and covers a large number of sensing elements, the sensing elements may be grouped together in a sensing-element group, and analog signal bandwidth reduction may occur so that the signal processing circuitry of the sensing-element group cannot reach the required analog signal bandwidth of a desired application. As an example, a beam spot of a charged particle beam may cover the sensing elements of section 1401 (see FIG. 14), and may cover some sensing elements of other adjacent sections (not shown). The sensing elements in section 1401 may be grouped together, along with the covered sensing elements in other sections. The input of one of the analog signal paths associated with section 1401 may be communicatively coupled to the sensing-element group. In some embodiments, if a requirement for analog signal bandwidth corresponding to a target pixel rate for processing the output signals for the group cannot be reached, a controller may divide the group into smaller subgroups, each of which may be communicatively coupled to the input of an analog signal path in section 1401 or analog signal paths in other sections that may be (at least partially) covered by the beam spot. In this way, signals may be transmitted through different subgroups and different signal processing circuitries. The signals of the subgroups may be summed together to represent an overall signal of the original group.

Reference will now be made to FIG. 16, which is a diagrammatic representation of a sensing element, consistent with embodiments of the present disclosure. FIG. 16 shows a sensing element 1606 that may be a single sensing element of a detector array that includes a plurality of sensing elements. Sensing element 1606 may be similar to any of sensing elements 312-314 in FIGS. 3A, 4A-4C, 10, and 14, any of sensing elements 511-513 in FIGS. 5-6, or any of sensing elements 701-706 in FIGS. 7, 8, and 13).

Sensing elements of a detector array may generate signals in response to incidence of incoming charged particles. Thus, a sensing element may act as a diode in that it may convert incident energy into a measurable signal, and may do so in predetermined directions. A sensing element of a detector array may be conceptualized as including a diode or other electrical components. As shown in FIG. 16, sensing element 1606 includes a diode 1624, a grounding switching element 1626, a grounding circuit 1627, an element-bus switching element 1628, and inter-element switching elements 1630 and 1632. In sensing element 1606, diode 1624 may convert energy of incident charged particles into a measurable electrical signal (e.g., current).

A grounding circuit may be used to release charges from a sensing element that is not in use. In some situations, sensing elements that are not in use may still receive charged particles exiting a wafer, for example when a sensing element is disconnected to reduce cross talk, noise, or parasitic parameters. If a sensing element is used for charged particle beam detection, a grounding switch at the sensing-element-level-circuit of the sensing element (e.g., grounding switching element 1626) may be kept communicatively disconnected (e.g., open). If a sensing element is not in use, the grounding switch may be set as communicatively connected (e.g., closed). Element-bus switching element 1628 may communicatively couple diode 1614 to output bus 1608 for detection signal outputting.

In some embodiments, grounding of a sensing element may be accomplished without a grounding switching element. For example, in some embodiments, a sensing element may be provided without a grounding switching element. To ground such a sensing element, the sensing element may be connected to other sensing elements that are not in use. The unused sensing elements may be grouped into one or more groups. The one or more groups may be connected to the input or inputs of analog signal paths that may be turned on. While the analog signal paths may be turned on, their output may be disconnected to an interconnection layer (e.g., interconnection layer 1006). That is, output may flow through analog signal paths connected to unused sensing elements, and such output may be discarded. This method may remove the need for a dedicated grounding switching element for each sensing element. Employing grounding switching elements may enhance flexibility (e.g., by allowing analog signal paths to be assigned for other uses) and reduce power consumption. On the other hand, omitting grounding switching elements may reduce manufacturing complexity.

Aspects of the present disclosure are set out in the following numbered clauses:

1. A detector comprising:
   a set of sensing elements comprising a first set of sensing elements and a second set of sensing elements;
   first section circuitry configured to communicatively couple the first set of sensing elements to an input of first signal processing circuitry;
   second section circuitry configured to communicatively couple the second set of sensing elements to an input of second signal processing circuitry; and
   interconnection circuitry configured to communicatively couple an output of the first signal processing circuitry to an output of the second signal processing circuitry.

2. The detector of clause 1, wherein the interconnection circuitry comprises an interconnection switching element configured to communicatively couple the output of the first signal processing circuitry to the output of the second signal processing circuitry.

3. The detector of any of clauses 1-2, further comprising:
   a first switching element configured to communicatively couple the first section circuitry to the input of the first signal processing circuitry.

4. The detector of any of clauses 1-3, further comprising:
   a second switching element configured to communicatively couple the output of the first signal processing circuitry to the interconnection circuitry.

5. The detector of any of clauses 1-4, further comprising:
   third signal processing circuitry communicatively coupled to the interconnection circuitry via a third switching element; and
   fourth signal processing circuitry communicatively coupled to the interconnection circuitry via a fourth switching element.

6. The detector of clause 5, further comprising:
   control circuitry communicatively coupled to the third signal processing circuitry, the fourth signal processing circuitry, the interconnection switching element, the third switching element, and the fourth switching element, wherein the control circuitry is configured to:
   control the third signal processing circuitry and the fourth signal processing circuitry to operate in an interleaving mode by communicatively coordinating the interconnection switching element, the third switching element, and the fourth switching element, wherein the third signal processing circuitry and the fourth signal processing circuitry receives a signal from at least one of the first signal processing circuitry or the second signal processing circuitry.

7. The detector of any of clauses 5-6, further comprising:
a multiplexer configured to communicatively couple the interconnection circuitry to the third signal processing circuitry and to receive a signal from at least one of the first signal processing circuitry or the second signal processing circuitry, and to output a multiplexed signal to the third signal processing circuitry.

8. The detector of clause 7, wherein the multiplexer is an analog multiplexer.

9. The detector of any of clauses 5-8, wherein the third signal processing circuitry comprises a first analog-to-digital converter (ADC), and the fourth signal processing circuitry comprises a second analog-to-digital converter (ADC).

10. The detector of clause 9, wherein at least one of the first ADC or the second ADC is configured to receive a current signal.

11. The detector of clause 9, wherein at least one of the first ADC or the second ADC is configured to receive an electric-charge signal.

12. The detector of any of clauses 10-11, wherein at least one of the first ADC or the second ADC comprises a converter communicatively coupled to a voltage-input ADC in series.

13. The detector of any of clauses 1-12, wherein the first signal processing circuitry and the second signal processing circuitry are configured to process analog signals.

14. The detector of clause 13, wherein the first signal processing circuitry comprises a first amplifier, and the second signal processing circuitry comprises a second amplifier.

15. The detector of clause 14, wherein at least one of the first amplifier or the second amplifier is configured to receive a current signal and to output an amplified current signal.

16. The detector of clause 14, wherein at least one of the first amplifier or the second amplifier is configured to receive an electric-charge signal and to output an amplified electric-charge signal.

17. The detector of any of clauses 15-16 and 118-119, wherein at least one of the first amplifier or the second amplifier is a single-stage amplifier.

18. The detector of any of clauses 15-16 and 118-119, wherein at least one of the first amplifier or the second amplifier is a multi-stage amplifier.

19. The detector of clause 18, wherein at least one of the first amplifier or the second amplifier comprises a third amplifier communicatively coupled to a fourth amplifier in series, and wherein the third amplifier comprises one of a charge-transfer amplifier, a transimpedance amplifier, or a dual-mode charge-transfer and transimpedance amplifier, and the fourth amplifier comprises a transconductance amplifier.

20. The detector of any of clauses 1-19, wherein the first section circuitry comprises a first wiring path, and the second section circuitry comprises a second wiring path.

21. A detection system comprising:
a set of sensing elements comprising a first set of sensing elements and a second set of sensing elements;
first section circuitry configured to communicatively couple the first set of sensing elements to an input of first signal processing circuitry;
second section circuitry configured to communicatively couple the second set of sensing elements to an input of second signal processing circuitry;
interconnection circuitry configured to communicatively couple an output of the first signal processing circuitry to an output of the second signal processing circuitry; and
an interface configured to control image signal processing of the detection system.

22. The detection system of clause 21, wherein the interconnection circuitry comprises an interconnection switching element configured to communicatively couple the output of the first signal processing circuitry to the output of the second signal processing circuitry.

23. The detection system of any of clauses 21-22, further comprising:
a first switching element configured to communicatively couple the first section circuitry to the input of the first signal processing circuitry.

24. The detection system of any of clauses 21-23, further comprising:
a second switching element configured to communicatively couple the output of the first signal processing circuitry to the interconnection circuitry.

25. The detection system of any of clauses 21-24, further comprising:
third signal processing circuitry communicatively coupled to the interconnection circuitry via a third switching element; and
fourth signal processing circuitry communicatively coupled to the interconnection circuitry via a fourth switching element.

26. The detection system of clause 25, further comprising:
control circuitry communicatively coupled to the third signal processing circuitry, the fourth signal processing circuitry, the interconnection switching element, the third switching element, and the fourth switching element, wherein the control circuitry is configured to:
control the third signal processing circuitry and the fourth signal processing circuitry to operate in an interleaving mode by communicatively coordinating the interconnection switching element, the third switching element, and the fourth switching element, wherein the third signal processing circuitry and the fourth signal processing circuitry receives a signal from at least one of the first signal processing circuitry or the second signal processing circuitry.

27. The detection system of any of clauses 25-26, further comprising:
a multiplexer configured to communicatively couple the interconnection circuitry to the third signal processing circuitry and to receive a signal from at least one of the first signal processing circuitry or the second signal processing circuitry, and to output a multiplexed signal to the third signal processing circuitry.

28. The detection system of clause 27, wherein the multiplexer is an analog multiplexer.

29. The detection system of any of clauses 25-28, wherein the third signal processing circuitry comprises a first analog-to-digital converter (ADC), and the fourth signal processing circuitry comprises a second analog-to-digital converter (ADC).
30. The detection system of clause 29, wherein at least one of the first ADC or the second ADC is configured to receive a current signal.
31. The detection system of clause 29, wherein at least one of the first ADC or the second ADC is configured to receive an electric-charge signal.
32. The detection system of any of clauses 30-31, wherein at least one of the first ADC or the second ADC comprises a converter communicatively coupled to a voltage-input ADC in series.
33. The detection system of clause 25-32, wherein the interface comprises a digital multiplexer communicatively coupled to the third signal processing circuitry and the fourth signal processing circuitry.
34. The detection system of any of clauses 21-33, wherein the first signal processing circuitry and the second signal processing circuitry are configured to process analog signals.
35. The detection system of clause 34, wherein the first signal processing circuitry comprises a first amplifier, and the second signal processing circuitry comprises a second amplifier.
36. The detection system of clause 35, wherein at least one of the first amplifier or the second amplifier is configured to receive a current signal and to output an amplified current signal.
37. The detection system of clause 35, wherein at least one of the first amplifier or the second amplifier is configured to receive an electric-charge signal and to output an amplified electric-charge signal.
38. The detection system of any of clauses 36-37 and 122-123, wherein at least one of the first amplifier or the second amplifier is a single-stage amplifier.
39. The detection system of any of clauses 36-37 and 122-123, wherein at least one of the first amplifier or the second amplifier is a multi-stage amplifier.
40. The detection system of clause 39, wherein at least one of the first amplifier or the second amplifier comprises a third amplifier communicatively coupled to a fourth amplifier in series, and wherein the third amplifier comprises one of a charge-transfer amplifier, a transimpedance amplifier, or a dual-mode charge-transfer and transimpedance amplifier, and the fourth amplifier comprises a transconductance amplifier
41. The detection system of any of clauses 21-40, wherein the first section circuitry comprises a first wiring path, and the second section circuitry comprises a second wiring path.
42. A charged-particle inspection system comprising:
    a charged-particle beam source configured to generate a primary charged-particle beam for sample scanning;
    a detector configured to receive a secondary charged-particle beam exiting from a point of incidence of the primary charged-particle beam, wherein the detector comprises:
        a set of sensing elements comprising a first set of sensing elements and a second set of sensing elements;
        first section circuitry configured to communicatively couple the first set of sensing elements to an input of first signal processing circuitry;
        second section circuitry configured to communicatively couple the second set of sensing elements to an input of second signal processing circuitry; and
        interconnection circuitry configured to communicatively couple an output of the first signal processing circuitry to an output of the second signal processing circuitry.
43. The charged-particle inspection system of clause 42, wherein the interconnection circuitry comprises an interconnection switching element configured to communicatively couple the output of the first signal processing circuitry to the output of the second signal processing circuitry.
44. The charged-particle inspection system of any of clauses 42-43, further comprising:
    a first switching element configured to communicatively couple the first section circuitry to the input of the first signal processing circuitry.
45. The charged-particle inspection system of any of clauses 42-44, further comprising:
    a second switching element configured to communicatively couple the output of the first signal processing circuitry to the interconnection circuitry.
46. The charged-particle inspection system of any of clauses 42-45, further comprising:
    third signal processing circuitry communicatively coupled to the interconnection circuitry via a third switching element; and
    fourth signal processing circuitry communicatively coupled to the interconnection circuitry via a fourth switching element.
47. The charged-particle inspection system of clause 46, further comprising:
    control circuitry communicatively coupled to the third signal processing circuitry, the fourth signal processing circuitry, the interconnection switching element, the third switching element, and the fourth switching element, wherein the control circuitry is configured to:
        control the third signal processing circuitry and the fourth signal processing circuitry to operate in an interleaving mode by communicatively coordinating the interconnection switching element, the third switching element, and the fourth switching element, wherein the third signal processing circuitry and the fourth signal processing circuitry receives a signal from at least one of the first signal processing circuitry or the second signal processing circuitry.
48. The charged-particle inspection system of any of clauses 46-47, further comprising:
    a multiplexer configured to communicatively couple the interconnection circuitry to the third signal processing circuitry and to receive a signal from at least one of the first signal processing circuitry or the second signal processing circuitry, and to output a multiplexed signal to the third signal processing circuitry.
49. The charged-particle inspection system of clause 48, wherein the multiplexer is an analog multiplexer.
50. The charged-particle inspection system of any of clauses 46-49, wherein the third signal processing circuitry comprises a first analog-to-digital converter (ADC), and the fourth signal processing circuitry comprises a second analog-to-digital converter (ADC).

51. The charged-particle inspection system of clause 50, wherein at least one of the first ADC or the second ADC is configured to receive a current signal.
52. The charged-particle inspection system of clause 50, wherein at least one of the first ADC or the second ADC is configured to receive an electric-charge signal.
53. The charged-particle inspection system of any of clauses 51-52, wherein at least one of the first ADC or the second ADC comprises a converter communicatively coupled to a voltage-input ADC in series.
54. The charged-particle inspection system of any of clauses 42-53, wherein the first signal processing circuitry and the second signal processing circuitry are configured to process analog signals.
55. The charged-particle inspection system of clause 54, wherein the first signal processing circuitry comprises a first amplifier, and the second signal processing circuitry comprises a second amplifier.
56. The charged-particle inspection system of clause 55, wherein at least one of the first amplifier or the second amplifier is configured to receive a current signal and to output an amplified current signal.
57. The charged-particle inspection system of clause 55, wherein at least one of the first amplifier or the second amplifier is configured to receive an electric-charge signal and to output an amplified electric-charge signal.
58. The charged-particle inspection system of any of clauses 56-57 and 126-127, wherein at least one of the first amplifier or the second amplifier is a single-stage amplifier.
59. The charged-particle inspection system of any of clauses 56-57 and 126-127, wherein at least one of the first amplifier or the second amplifier is a multi-stage amplifier.
60. The charged-particle inspection system of clause 59, wherein at least one of the first amplifier or the second amplifier comprises a third amplifier communicatively coupled to a fourth amplifier in series, and wherein the third amplifier comprises one of a charge-transfer amplifier, a transimpedance amplifier, or a dual-mode charge-transfer and transimpedance amplifier, and the fourth amplifier comprises a transconductance amplifier.
61. The charged-particle inspection system of any of clauses 42-60, wherein the first section circuitry comprises a first wiring path, and the second section circuitry comprises a second wiring path.
62. A detector comprising:
    a plurality of sensing elements comprising a first set of sensing elements and a second set of sensing elements;
    first section circuitry configured to communicatively couple the first set of sensing elements to an input of first signal processing circuitry; and
    second section circuitry configured to communicatively couple the second set of sensing elements to an input of second signal processing circuitry, wherein
    the first signal processing circuitry comprises a first amplifier, and the second signal processing circuitry comprises a second amplifier, and
    at least one of the first amplifier or the second amplifier is configured to perform one of receiving a current signal and outputting an amplified current signal, receiving a current signal and outputting an electric-charge signal, receiving an electric-charge signal and outputting a current signal, or receiving an electric-charge signal and outputting an amplified electric-charge signal
63. The detector of clause 62, further comprising:
    interconnection circuitry configured to communicatively couple an output of the first signal processing circuitry to an output of the second signal processing circuitry.
64. The detector of clause 63, wherein the interconnection circuitry comprises an interconnection switching element configured to communicatively couple the output of the first signal processing circuitry to the output of the second signal processing circuitry.
65. The detector of any of clauses 63-64, further comprising:
    a second switching element configured to communicatively couple the output of the first signal processing circuitry to the interconnection circuitry.
66. The detector of any of clauses 63-65, further comprising:
    third signal processing circuitry communicatively coupled to the interconnection circuitry via a third switching element; and
    fourth signal processing circuitry communicatively coupled to the interconnection circuitry via a fourth switching element.
67. The detector of clause 66, further comprising:
    control circuitry communicatively coupled to the third signal processing circuitry, the fourth signal processing circuitry, the interconnection switching element, the third switching element, and the fourth switching element, wherein the control circuitry is configured to:
        control the third signal processing circuitry and the fourth signal processing circuitry to operate in an interleaving mode by communicatively coordinating the interconnection switching element, the third switching element, and the fourth switching element, wherein the third signal processing circuitry and the fourth signal processing circuitry receives a signal from at least one of the first signal processing circuitry or the second signal processing circuitry.
68. The detector of any of clauses 66-67, further comprising:
    a multiplexer configured to communicatively couple the interconnection circuitry to the third signal processing circuitry and to receive a signal from at least one of the first signal processing circuitry or the second signal processing circuitry, and to output a multiplexed signal to the third signal processing circuitry.
69. The detector of clause 68, wherein the multiplexer is an analog multiplexer.
70. The detector of any of clauses 66-69, wherein the third signal processing circuitry comprises a first analog-to-digital converter (ADC), and the fourth signal processing circuitry comprises a second analog-to-digital converter (ADC).
71. The detector of clause 70, wherein at least one of the first ADC or the second ADC is configured to receive a current signal.
72. The detector of clause 70, wherein at least one of the first ADC or the second ADC is configured to receive an electric-charge signal.

73. The detector of any of clauses 71-72, wherein at least one of the first ADC or the second ADC comprises a converter communicatively coupled to a voltage-input ADC in series.
74. The detector of any of clauses 62-73, further comprising:
a first switching element configured to communicatively couple the first section circuitry to the input of the first signal processing circuitry.
75. The detector of any of clauses 62-74, wherein the first signal processing circuitry and the second signal processing circuitry are configured to process analog signals.
76. The detector of any of clauses 62-75, wherein at least one of the first amplifier or the second amplifier comprises a third amplifier communicatively coupled to a fourth amplifier in series, and wherein the third amplifier comprises one of a charge-transfer amplifier, a transimpedance amplifier, or a dual-mode charge-transfer and transimpedance amplifier, and the fourth amplifier comprises a transconductance amplifier.
77. The detector of any of clauses 62-76, wherein the first section circuitry comprises a first wiring path, and the second section circuitry comprises a second wiring path.
78. A computer-implemented method, comprising:
determining a sensing-element group comprising a sensing element onto which a beam spot of a charged-particle beam is projected in a charged-particle detector;
determining whether the beam spot satisfies a condition;
determining an output path of the sensing-element group; and
transmitting a signal from an interconnection layer to a first analog-to-digital converter (ADC) communicatively coupled to a first output of the interconnection layer.
79. The computer-implemented method of clause 78, wherein the sensing-element group comprises a plurality of sensing elements.
80. The computer-implemented method of clause 78 or 79, wherein determining whether the beam spot satisfies the condition comprises:
determining a size of the beam spot; and
comparing the size to a threshold.
81. The computer-implemented method of clause 78 or 79, wherein determining whether the beam spot satisfies the condition comprises:
determining whether a target analog bandwidth corresponding to a target pixel rate is achievable for the sensing-element group.
82. The computer-implemented method of any of clauses 79-81, further comprising:
communicatively coupling two adjacent sensing elements in the sensing-element group.
83. The computer-implemented method of clause 82, wherein communicatively coupling the two adjacent sensing elements comprises:
communicatively connecting an inter-element switching element between the two adjacent sensing elements.
84. The computer-implemented method of any of clauses 78-83, further comprising:
based on a determination that the beam spot satisfies the condition, determining a plurality of sensing-element subgroups, each of the plurality of sensing-element subgroups comprising at least one sensing element of the sensing-element group, and
dividing the sensing-element group into the plurality of sensing-element subgroups based on a total analog bandwidth for processing an output of the sensing-element group corresponding to a target pixel rate.
85. The computer-implemented method of any of clauses 78-84, wherein determining the output path comprises:
communicatively coupling outputs of sensing elements of the sensing-element group to a signal processing circuit of the charged-particle detector.
86. The computer-implemented method of clause 84, further comprising: communicatively coupling a sensing-element subgroup of the plurality of sensing-element subgroups to a signal processing circuit; and
communicatively connecting a switching element between a sensing element of the sensing-element subgroup and a wiring path of the signal processing circuit.
87. The computer-implemented method of clause 86, further comprising:
determining a common output for the sensing-element subgroup.
88. The computer-implemented method of clause 87, wherein determining the common output comprises:
determining a geometric center of the sensing-element subgroup; and
determining the common output as an output of a sensing element nearest to the geometric center.
89. The computer-implemented method of clause 87, wherein determining the common output comprises:
determining a mass center of an intensity distribution in the sensing-element subgroup; and
determining the common output as an output of a sensing element nearest to the mass center.
90. The computer-implemented method of any of clauses 87-89, wherein communicatively coupling the sensing-element subgroup of the plurality of sensing-element subgroups to the signal processing circuit comprises:
communicatively coupling the common output to the signal processing circuit.
91. The computer-implemented method of clause 90, wherein communicatively coupling the common output to the signal processing circuit comprises:
communicatively connecting a switching element between the common output and the wiring path of the signal processing circuit.
92. The computer-implemented method of any of clauses 87-91, wherein the signal processing circuit has a shortest distance to the common output among a plurality of signal processing circuits of the charged-particle detector.
93. The computer-implemented method of clause 78, further comprising:
determining a combined signal using output signals of a plurality of signal processing circuits of the charged-particle detector at the first output of the interconnection layer, the first output being communicatively coupled to the plurality of signal processing circuits.
94. The computer-implemented method of clause 93, wherein determining the combined signal:
communicatively connecting switching elements between the interconnection layer and outputs of the plurality of signal processing circuits;
communicatively connecting an interconnection switching element communicatively coupled to the first output of the interconnection layer and the outputs of the plurality of signal processing circuits; and
determining the combined signal by summing the output signals at the first output of the interconnection layer.
95. The computer-implemented method of clause 94, wherein transmitting the signal to the first ADC comprises:
communicatively connecting a switching element between the first output of the interconnection layer and the first ADC.
96. The computer-implemented method of any of clauses 78-95, further comprising:
acquiring a detection image indicating a projection pattern of the beam spot on the charged-particle detector.
97. The computer-implemented method of clause 96, wherein acquiring the detection image comprises:
reading individual outputs of sensing elements of the charged-particle detector.
98. The computer-implemented method of any of clauses 78-97, further comprising:
determining a boundary of the beam spot,
wherein determining the sensing-element group comprises grouping together sensing elements within the boundary.
99. The computer-implemented method of clause 98, wherein grouping together sensing elements within the boundary comprises:
actuating switches so as to communicatively couple the sensing elements in the sensing-element group.
100. The computer-implemented method of any of clauses 78-99, further comprising:
grounding an unused sensing elements based on whether the unused sensing element is included in the sensing-element group.
101. The computer-implemented method of clause 100, wherein grounding the unused sensing element comprises actuating a grounding switch.
102. The computer-implemented method of clause 100, wherein grounding the unused sensing element comprises connecting the unused sensing element to a signal path that is disconnected from the interconnection layer.
103. The computer-implemented method of clause 78, further comprising:
actuating switches to connect the sensing element group to the output path.
104. The computer-implemented method of clause 84, further comprising:
actuating switches to connect the plurality of sensing element subgroups to a respective output path.
105. The computer-implemented method of any of clauses 78-104, further comprising performing signal processing.
106. The computer-implemented method of clause 105, wherein the signal processing comprises:
amplifying the signal transmitted through the output path;
digitizing the signal using the ADC.
107. The computer-implemented method of clause 84, further comprising performing signal processing that comprises:
adding together signals from the plurality of subgroups.
108. The computer-implemented method of any of clauses 78-107, further comprising:
comparing a target pixel rate to a top sampling rate of the first ADC.
109. The computer-implemented method of clause 108, further comprising:
if the target pixel rate is greater than the top sampling rate of the first ADC, performing interleaving;
if the target pixel rate is less than or equal to the top sampling rate of the first ADC, connecting output paths of the plurality of subgroups to the first ADC; and
if the target pixel rate is much less than the top sampling rate of the first ADC, connecting output paths of other sensing-element groups to the first ADC.
110. The computer-implemented method of clause 109, wherein interleaving comprises:
actuating a switching element of the interconnection layer to alternately connect the output path to the first ADC and a second ADC.
111. The computer-implemented method of any of clauses 78-110, wherein the charged-particle detector is a component of a scanning electron microscope (SEM).
112. The computer-implemented method of any of clauses 78-111, wherein the charged-particle detector is included in a single-beam inspection apparatus.
113. The computer-implemented method of any of clauses 78-111, wherein the charged-particle detector is included in a multi-beam inspection apparatus.
114. The computer-implemented method of any of clauses 78-113, further comprising converting a current to digital information using the first ADC.
115. The computer-implemented method of any of clauses 78-113, further comprising converting a charge to digital information using the first ADC.
116. The detector of clause 12, wherein the converter comprises a current-to-voltage converter.
117. The detector of clause 12, wherein the converter comprises a charge-to-voltage converter.
118. The detector of clause 14, wherein the first amplifier is configured to receive a current signal or an electric-charge signal, and the first amplifier is configured to output a current signal or an electric-charge signal,
and the second amplifier is configured to receive a current signal or an electric charge signal, and the second amplifier is configured to output a current signal or an electric-charge signal.
119. The detector of clause 14, wherein the first amplifier is configured to receive a current signal and output an electric charge signal, or vice versa, and
the second amplifier is configured to receive a current signal and output an electric-charge signal, or vice versa.
120. The detection system of clause 32, wherein the converter comprises a current-to-voltage converter.
121. The detection system of clause 32, wherein the converter comprises a charge-to-voltage converter.
122. The detection system of clause 35, wherein the first amplifier is configured to receive a current signal or an electric-charge signal, and the first amplifier is configured to output a current signal or an electric-charge signal,
and the second amplifier is configured to receive a current signal or an electric charge signal, and the second amplifier is configured to output a current signal or an electric-charge signal.

123. The detection system of clause 35, wherein the first amplifier is configured to receive a current signal and output an electric charge signal, or vice versa, and the second amplifier is configured to receive a current signal and output an electric-charge signal, or vice versa.

124. The detection system of clause 53, wherein the converter comprises a current-to-voltage converter.

125. The detection system of clause 53, wherein the converter comprises a charge-to-voltage converter.

126. The detection system of clause 56, wherein the first amplifier is configured to receive a current signal or an electric-charge signal, and the first amplifier is configured to output a current signal or an electric-charge signal, and the second amplifier is configured to receive a current signal or an electric charge signal, and the second amplifier is configured to output a current signal or an electric-charge signal.

127. The detection system of clause 56, wherein the first amplifier is configured to receive a current signal and output an electric charge signal, or vice versa, and the second amplifier is configured to receive a current signal and output an electric-charge signal, or vice versa.

128. The detection system of clause 73, wherein the converter comprises a current-to-voltage converter.

129. The detection system of clause 73, wherein the converter comprises a charge-to-voltage converter.

A non-transitory computer-readable medium may be provided that stores instructions for a processor of a controller (e.g., controller 109 in FIG. 1 or controller 904 in FIG. 9) for detecting a charged-particle beam according to the exemplary flowchart of FIG. 15 discussed above, consistent with embodiments in the present disclosure. For example, the instructions stored in the non-transitory computer-readable medium may be executed by the circuitry of the controller for performing method 1500 in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

With significantly increased configuration flexibility and performance adaptability, the architectures as shown and described in FIGS. 10, 13, and 14 may further push the performance capability of detection device 244 to a higher limit without causing significant costs, which may, in turn, enable the building of a more capable single-beam or multibeam inspection tool.

It will be appreciated that the embodiments of the present disclosure are not limited to the exact construction that has been described above and illustrated in the accompanying drawings and that various modifications and changes may be made without departing from the scope thereof. The present disclosure has been described in connection with various embodiments, but other embodiments of the invention will be apparent to those skilled in the art from consideration of the specification and practice of the invention disclosed herein. It is intended that the specification and examples be considered as exemplary only.

The invention claimed is:

1. A detector comprising:
a set of sensing elements comprising a first set of sensing elements and a second set of sensing elements;
first section circuitry configured to communicatively couple the first set of sensing elements to an input of first signal processing circuitry;
second section circuitry configured to communicatively couple the second set of sensing elements to an input of second signal processing circuitry; and
interconnection circuitry configured to communicatively couple an output of the first signal processing circuitry to an output of the second signal processing circuitry.

2. The detector of claim 1, wherein the interconnection circuitry comprises an interconnection switching element configured to communicatively couple the output of the first signal processing circuitry to the output of the second signal processing circuitry.

3. The detector of claim 1, further comprising:
a first switching element configured to communicatively couple the first section circuitry to the input of the first signal processing circuitry.

4. The detector of claim 1, further comprising:
a second switching element configured to communicatively couple the output of the first signal processing circuitry to the interconnection circuitry.

5. The detector of claim 1, further comprising:
third signal processing circuitry communicatively coupled to the interconnection circuitry via a third switching element; and
fourth signal processing circuitry communicatively coupled to the interconnection circuitry via a fourth switching element.

6. The detector of claim 5, further comprising:
control circuitry communicatively coupled to the third signal processing circuitry, the fourth signal processing circuitry, the interconnection switching element, the third switching element, and the fourth switching element, wherein the control circuitry is configured to:
control the third signal processing circuitry and the fourth signal processing circuitry to operate in an interleaving mode by communicatively coordinating the interconnection switching element, the third switching element, and the fourth switching element, wherein the third signal processing circuitry and the fourth signal processing circuitry receives a signal from at least one of the first signal processing circuity or the second signal processing circuitry.

7. The detector of claim 5, further comprising:
a multiplexer configured to communicatively couple the interconnection circuitry to the third signal processing circuitry and to receive a signal from at least one of the first signal processing circuity or the second signal processing circuitry, and to output a multiplexed signal to the third signal processing circuitry.

8. The detector of claim 7, wherein the multiplexer is an analog multiplexer.

9. The detector of claim 5, wherein the third signal processing circuity comprises a first analog-to-digital converter (ADC), and the fourth signal processing circuitry comprises a second analog-to-digital converter (ADC).

10. The detector of claim 9, wherein at least one of the first ADC or the second ADC is configured to receive a current signal.

11. The detector of claim 9, wherein at least one of the first ADC or the second ADC is configured to receive an electric-charge signal.

12. The detector of claim 10, wherein at least one of the first ADC or the second ADC comprises a converter communicatively coupled to a voltage-input ADC in series.

13. The detector of claim 1, wherein the first signal processing circuitry and the second signal processing circuitry are configured to process analog signals.

14. The detector of claim 13, wherein the first signal processing circuitry comprises a first amplifier, and the second signal processing circuitry comprises a second amplifier.

15. The detector of claim 12, wherein the converter comprises a current-to-voltage converter.

16. The detector of claim 12, wherein the converter comprises a charge-to-voltage converter.

17. The detector of claim 14, wherein the first amplifier is configured to receive a current signal or an electric-charge signal, and the first amplifier is configured to output a current signal or an electric-charge signal, and the second amplifier is configured to receive a current signal or an electric charge signal, and the second amplifier is configured to output a current signal or an electric-charge signal.

18. The detector of claim 14, wherein the first amplifier is configured to receive a current signal and output an electric charge signal, or vice versa, and the second amplifier is configured to receive a current signal and output an electric-charge signal, or vice versa.

19. A computer-implemented method, comprising:
 determining a sensing-element group comprising a sensing element onto which a beam spot of a charged-particle beam is projected in a charged-particle detector;
 determining whether the beam spot satisfies a condition;
 determining an output path of the sensing-element group; and
 transmitting a signal from an interconnection layer to a first analog-to-digital converter (ADC) communicatively coupled to a first output of the interconnection layer.

20. The computer-implemented method of claim 19, wherein
 determining whether the beam spot satisfies the condition comprises:
 determining a size of the beam spot; and
 comparing the size to a threshold.

* * * * *